(12) United States Patent
Gao et al.

(10) Patent No.: US 11,980,844 B2
(45) Date of Patent: May 14, 2024

(54) METHOD FOR CARBON DIOXIDE CAPTURE AND CONCENTRATION BY PARTITIONED MULTISTAGE CIRCULATION BASED ON MASS TRANSFER-REACTION REGULATION

(71) Applicant: ZHEJIANG UNIVERSITY, Hangzhou (CN)

(72) Inventors: Xiang Gao, Hangzhou (CN); Chenghang Zheng, Hangzhou (CN); Chang Liu, Hangzhou (CN); Can Zhou, Hangzhou (CN); You Zhang, Hangzhou (CN); Zhongyang Zhao, Hangzhou (CN); Yongxin Zhang, Hangzhou (CN); Yang Zhang, Hangzhou (CN); Qinwu Li, Hangzhou (CN); Weiguo Weng, Hangzhou (CN); Weihong Wu, Hangzhou (CN); Qingyi Li, Hangzhou (CN); Xiao Zhang, Hangzhou (CN); Tao Wang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 170 days.

(21) Appl. No.: 17/566,659

(22) Filed: Dec. 30, 2021

(65) Prior Publication Data
US 2023/0033705 A1 Feb. 2, 2023

(30) Foreign Application Priority Data

Jul. 26, 2021 (CN) .......................... 202110845143.2

(51) Int. Cl.
*B01D 53/14* (2006.01)
*B01D 53/18* (2006.01)
(Continued)

(52) U.S. Cl.
CPC ..... *B01D 53/1406* (2013.01); *B01D 53/1412* (2013.01); *B01D 53/145* (2013.01);
(Continued)

(58) Field of Classification Search
CPC ............ B01D 53/1406; B01D 53/1412; B01D 53/145; B01D 53/1475; B01D 53/1493;
(Continued)

(56) References Cited

U.S. PATENT DOCUMENTS

| 3,593,497 A * | 7/1971 | Grimm ................. C01B 17/806 261/21 |
| 6,592,829 B2 * | 7/2003 | Chakravarti ....... B01D 53/1475 422/171 |

(Continued)

FOREIGN PATENT DOCUMENTS

| CN | 111203086 A | * | 5/2020 | ............. B01D 53/60 |
| CN | 115372210 A | * | 11/2022 | |

(Continued)

OTHER PUBLICATIONS

"Water softening" Wikipedia published Oct. 23, 2017 accessed at <https://en.wikipedia.org/w/index.php?title=Water_softening&oldid=806679488> (Year: 2017).*

*Primary Examiner* — Stephen Hobson
(74) *Attorney, Agent, or Firm* — Jiwen Chen; Joywin IP Law PLLC

(57) ABSTRACT

The present invention relates to a method for carbon dioxide capture and concentration by partitioned multistage circulation based on mass transfer-reaction regulation. In the present invention, multiple means such as multistage circulating absorption, intelligent multi-factor regulation, pre-washing and cooling, inter-stage cooling, post-stage washing, slurry cleaning, cooling water waste heat utilization, small-particle-size and high-density spraying, external (Continued)

strengthening field such as a thermal field/ultrasonic field/ electric field, and catalysis by composite catalyst are adopted, so that the target for low cost, low energy consumption, stability and high efficiency is realized. The secondary pollutants are effectively inhibited while carbon dioxide is efficiently captured; meanwhile, high-efficiency capture, low-energy desorption, and high-purity concentration of carbon dioxide are implemented. From top to bottom in sequence, the multistage circulation is used to remove aerosols, improves carbon capture efficiency, maintains absorption rate, concentrates solution, which reduces the carbon emission reduction cost.

8 Claims, 4 Drawing Sheets

(51) Int. Cl.
 *B01D 53/78* (2006.01)
 *C01B 17/80* (2006.01)

(52) U.S. Cl.
 CPC ..... *B01D 53/1475* (2013.01); *B01D 53/1493* (2013.01); *B01D 53/185* (2013.01); *B01D 53/78* (2013.01); *B01D 2252/103* (2013.01); *B01D 2257/504* (2013.01); *B01D 2258/0283* (2013.01); *C01B 17/806* (2013.01)

(58) Field of Classification Search
 CPC ............... B01D 53/185; B01D 53/78; B01D 2252/103; B01D 2257/504; B01D 2258/0283; B01D 2252/204; B01D 2252/602; B01D 53/1425; B01D 53/62; B01D 53/1418; B01D 53/50; B01D 53/54; B01D 53/60; B01D 53/68; B01D 53/75; B01D 53/96; C01B 17/806; C01B 32/50; Y02A 50/2351; Y02C 20/40; Y02P 20/129; Y02P 20/151

See application file for complete search history.

(56) References Cited

U.S. PATENT DOCUMENTS

| | | | | |
|---|---|---|---|---|
| 2016/0361682 | A1* | 12/2016 | Yukumoto | B01D 53/1406 |
| 2017/0165603 | A1* | 6/2017 | Fujita | B01D 53/18 |
| 2017/0349437 | A1* | 12/2017 | Daum | C01B 17/7655 |
| 2018/0001254 | A1* | 1/2018 | Fujita | B01D 53/1412 |
| 2018/0169569 | A1* | 6/2018 | Dube | F28C 1/003 |
| 2018/0326348 | A1* | 11/2018 | Tanna | C10K 1/004 |
| 2019/0001256 | A1* | 1/2019 | Wen | B01D 53/1462 |
| 2019/0202694 | A1* | 7/2019 | Clark | C01B 17/765 |
| 2019/0382324 | A1* | 12/2019 | Zellhuber | B01D 53/1406 |
| 2019/0388836 | A1* | 12/2019 | Bumb | B01D 53/83 |
| 2020/0188839 | A1* | 6/2020 | Liu | B01D 53/18 |
| 2020/0188840 | A1* | 6/2020 | Novek | B01D 53/1431 |

FOREIGN PATENT DOCUMENTS

| | | | | |
|---|---|---|---|---|
| CN | 218012023 U | * | 12/2022 | |
| CN | 115738633 A | * | 3/2023 | |
| CN | 111107867 B | * | 7/2023 | A23L 33/18 |
| CN | 115055197 B | * | 7/2023 | |

* cited by examiner

METHOD FOR CARBON DIOXIDE CAPTURE AND CONCENTRATION BY PARTITIONED MULTISTAGE CIRCULATION BASED ON MASS TRANSFER-REACTION REGULATION

This application claims priority to Chinese Patent Application No. 202110845143.2 filed Jul. 26, 2021, which is hereby incorporated by reference.

BACKGROUND OF THE INVENTION

1. Technical Field

The present invention relates to the field of air pollution control and $CO_2$ emission reduction technologies, and in particular, to a method for carbon dioxide capture and concentration by partitioned multistage circulation based on mass transfer-reaction regulation.

2. Description of Related Art

As one of main components of greenhouse gases that cause global warming, carbon dioxide mainly comes from the combustion of fossil fuels such as coal, oil, and natural gas. However, coal-fired units and multi chemical industries emit a large amount of carbon, and overall smoke exhaust properties are as follows: a large amount of flue gas is generated, and the content and partial pressure of carbon dioxide in the flue gas are low, which result in a high carbon dioxide capture cost; the flue gas contains impurities such as $SO_2$, $SO_3$, $NO_x$, heavy metals, and particulate matter (PM), so that secondary pollutants are easily generated, which has a certain negative impact on the carbon dioxide capture process. At present, requirements for carbon emission reduction are becoming increasingly higher. Main technical means of carbon emission reduction are carbon capture and storage (CCS) and carbon capture, utilization, and storage (CCUS). In China, carbon capture technology is being explored, and relatively large carbon capture demonstration projects have been built in petrochemical and chemical industries. Capturing carbon dioxide from tail gas is used for chemical engineering, oil displacement, geological storage or biological carbon sequestration. A plurality of carbon capture demonstration projects have also been built in the electric power industry. However, some projects have been shut down for a long time or have insufficient operational time due to the high operating cost of a system and difficulty in product sale. Among capture, transportation, utilization and storage in the CCUS technology, the energy consumption and costs of capture accounts for a large proportion. Currently, the capture cost of low concentration carbon dioxide in China is 300-600 yuan/t. Post-combustion capture technology is widely used and MEA chemical absorption method as one of the representatives own the operation energy consumption of 4.0-6.0 MJ/kg carbon dioxide, which lowers thermal efficiency of coal-fired power plants by 25%-40%. It is difficult to meet urgent requirements of reducing $CO_2$ emissions because of excessively high investment and operation costs. Therefore, it is extremely urgent to develop a energy saving and low cost post-combustion capture technology.

Chinese patent CN 102784546 A discloses a carbon dioxide capture system, which includes a two-stage absorption tower composed of a lower semi-lean solution section and an upper lean solution section that are vertically connected in series. A bottom rich solution enters an atmospheric desorption tower, and a liquid outlet at the bottom of the atmospheric desorption tower is connected to an upper liquid inlet of the semi-lean solution section of the two-section absorption tower. The liquid outlet at the bottom of the atmospheric desorption tower is further connected to a liquid inlet at the top of the desorption tower, and the desorption tower is connected to a reboiler. In the invention, the semi-lean solution/lean solution method increases a carbon dioxide capture rate, and the combination of atmospheric desorption and solution desorption increases a carbon dioxide recovery rate. However, this technology has the following shortcomings: the semi-lean solution section does not absorb an absorption liquid to saturation before the absorption liquid is sent to the desorption tower, and no circulating absorption liquid is added to the desorption tower, so that the flow rate is large, and the desorption energy consumption is large; and secondary pollutants such as aerosols are not controlled.

Chinese patent No. CN 109745850 A discloses a pretreatment system for carbon dioxide capture in a coal-fired power plant. The system includes: a washing tower, a plurality of packing layer bodies disposed in the washing tower and distributed from bottom to top, a circulating water cooler, an automatic alkali adding device, and a salinity adjusting device. The system uses a combination of the plurality of packing layers to remove harmful substances such as dust and $SO_2$ in flue gas. The automatic alkali adding device and the salinity adjusting device that are disposed outside the washing tower can effectively remove acidic substances in smoke dust. However, this technology has the following disadvantages: the washing tower and a capture tower are separately arranged, an investment and operation cost is high, the difficulty in further improving carbon dioxide capture efficiency is high, desorption energy consumption is high, an adjustable range of system operation parameters is small, and the adjustable performance is poor.

To reduce the high cost of carbon capture system, developing a novel absorbent with high absorption rate, large absorption capacity, and low desorption energy consumption is the most effective method. However, due to a high technical difficulty, a lot of experimental accumulation is required.

Therefore, in view of the shortcomings of the prior art, it is urgent to develop a method for $CO_2$ capture and concentration with low cost, high stability and capture efficiency.

BRIEF SUMMARY OF THE INVENTION

To overcome the shortcomings existing in the prior art, the present invention provides a method for carbon dioxide capture and concentration by partitioned multistage circulation based on mass transfer-reaction regulation. The method gives full play to its advantages of high $CO_2$ capture efficiency and regulates $CO_2$ absorption process in each circulation in a partitioned manner, which implements staged regulation over absorption process and desorption process. As a result, the multistage circulation method greatly reduces capture energy consumption and is easy to operate.

The technical solution adopted in the present invention is as follows:

A method for carbon dioxide capture and concentration by partitioned multistage circulation based on mass transfer-reaction regulation, comprising: introducing flue gas into a multistage circulating absorption tower, performing impurity removal and cooling on the flue gas through a flue gas pre-washing device disposed in the front and then introducing the flue gas into first to $(n-1)^{th}$ stages of carbon dioxide absorption systems and $n^{th}$ stages of washing system, wherein n is greater than or equal to 3; introducing rich solution into carbon dioxide desorption tower through rich solution and lean solution heat exchanger; discharging lean solution out of the carbon dioxide desorption tower and introducing the lean solution into the rich solution and lean solution heat exchanger; introducing regenerated steam of the carbon dioxide desorption tower into carbon dioxide concentration device, and introducing the regenerated steam into a gas-liquid separator through a cooler; connecting an intelligent regulation system to the first to $(n-1)^{th}$ stages of carbon dioxide absorption systems, the $n^{th}$ stages of washing system, and the carbon dioxide desorption tower; and connecting in series the first to $(n-1)^{th}$ stages of carbon dioxide absorption systems and the $n^{th}$ stages of washing system in the multistage circulating absorption tower stage by stage from bottom to top.

A pre-washing section is a venturi pre-washing section or a vertical pre-washing tower; washing, impurity removal and cooling water of the pre-washing device is softened water, which is sprayed by a high-efficiency atomizing nozzle, and the washing, impurity removal and cooling water is recycled, and regularly discharged to a wet desulfurization slurry-preparing system as slurry preparing water.

With an n-stage circulating absorption tower (n=4) provided with a venturi pre-washing section as an example, the pre-washing device is the venturi pre-washing section, and the multistage circulating absorption tower is a four-stage circulating absorption tower with n equal to 4; and the method comprises the following steps:

(1) introducing flue gas into the four-stage circulating absorption tower, and performing impurity ion removal and cooling on the flue gas through the venturi pre-washing section disposed in the front and then introducing the flue gas into a first-stage carbon dioxide (circulating) absorption system, a second-stage carbon dioxide (circulating) absorption system, a third-stage carbon dioxide (circulating) absorption system, and a fourth-stage (circulating) washing system in sequence, wherein an absorbent circulates in the first-stage carbon dioxide absorption system with pH of 7.7-9.0 at 49-60° C.;

an absorbent circulates in the second-stage carbon dioxide absorption system with pH of 8.0-10.0 at 44-53° C.;

an absorbent circulates in the third-stage carbon dioxide absorption system with pH of 9.5-11.5 at 40-48° C.; and softened water circulates in the fourth-stage washing system with pH of 8.5-10.0 at 40-48° C.;

(2) heating rich solution through rich solution and lean solution heat exchanger to 90-98° C. and then introducing the rich solution into carbon dioxide desorption tower; after absorption liquid is heated to 105-115° C., enhancing carbon dioxide desorption by the rich solution under the coupling action of a plurality of fields such as a thermal field, an ultrasonic field, and an electric field; and using a composite catalyst that is one or more of a $\gamma$-$Al_2O_3$/zeolite molecular sieve, an $SO_4^{2-}$/$ZrO_2$-zeolite molecular sieve, a shell-coated $SO_4^{2-}$/$ZrO_2$-zeolite molecular sieve, shell-coated $SO_4^{2-}$/$ZrO_2$—$TiO_2$, and shell-coated $SO_4^{2-}$/$CoO$—$TiO_2$ to improve stability and reduce desorption energy consumption; and discharging lean solution out of the carbon dioxide desorption tower and introducing the lean solution into the rich solution and lean solution heat exchanger for cooling to 60-68° C., introducing the lean solution into a cleaning device, and then introducing the lean solution into the third-stage carbon dioxide absorption system;

(3) introducing regenerated steam of the carbon dioxide desorption tower into carbon dioxide concentration device, cooling the regenerated steam by cooler to the boiling point of carbon dioxide or below, and introducing the regenerated steam into a gas-liquid separator to obtain high-purity carbon dioxide; and (4) connecting an intelligent regulation system to the first-stage carbon dioxide absorption system, the second-stage carbon dioxide absorption system, the third-stage carbon dioxide absorption system, the fourth-stage washing system, and the carbon dioxide desorption tower, and establishing a global optimization parameter model of carbon dioxide absorption and carbon dioxide desorption by partitioned multistage circulation based on key parameters comprising pH, temperature, and circulation quantity in each stage to implement stable, efficient and low-cost operation of the system.

The resistance weight of a carbon dioxide absorption tower at a different height is different. The resistance analysis of the carbon dioxide absorption tower at different tower heights is shown in FIG. 1. With the increase in the tower height, gas phase diffusion resistance gradually increases, and liquid phase reaction resistance gradually decreases. The carbon dioxide absorption rate at lower position of the absorption tower is limited by the liquid phase reaction resistance, and the carbon dioxide absorption quantity can be increased by increasing slurry residence time. In the middle portion of the absorption tower, three kinds of resistances are relatively average, overall absorption resistance is small, and the middle portion of the absorption tower is the main carbon dioxide absorption section. The carbon dioxide absorption rate at a higher position of the absorption tower is limited by gas phase diffusion resistance, and the gas-liquid concentration gradient can be increased by increasing the pH of the absorbent, so that decarburization efficiency is improved. Through the theoretical design, the present invention provides a method for carbon dioxide capture and concentration by partitioned multistage circulation based on mass transfer-reaction regulation in a mode of multistage decarburization and one-stage washing.

Preferably, the first-stage carbon dioxide absorption system comprises first-section packing layer, first-section nozzle, first partition plate, and a first gas lifting cap that are sequentially disposed from bottom to top, and the bottom of the absorption tower communicates with the first-section nozzle through rich solution pump and first-section circulating cooler;

The second-stage carbon dioxide absorption system comprises second-section packing layer, second-section nozzle, second partition plate, and second gas lifting cap that are sequentially disposed from bottom to top, the bottom of the second-stage carbon dioxide absorption system communicates with second-section circulating tank, and the second-section circulating tank communicates with the second-section nozzle through second-section circulating pump and second-section circulating cooler;

The third-stage carbon dioxide absorption system comprises third-section packing layer, third-section nozzle, third partition plate, and third gas lifting cap that are sequentially disposed from bottom to top, the bottom of the third-stage carbon dioxide absorption system communicates with third-section circulating tank, and the third-section circulating tank communicates with the third-section nozzle through third-section circulating pump and third-section circulating cooler; and The fourth-stage washing system comprises fourth-section packing layer and fourth-section nozzle that are sequentially disposed from bottom to top, the bottom of the fourth-stage washing system communicates with fourth-section circulating tank, and the fourth-section circulating tank communicates with the fourth-section nozzle through fourth-section circulating pump and fourth-section circulating cooler.

Preferably, turbulence device and first demister for removing aerosols and liquid drops are disposed in the multistage circulating absorption tower, and the turbulence device and the first demister are located above the nth-stage washing system.

Preferably, the first-section nozzle, the second-section nozzle, the third-section nozzle, and the fourth-section nozzle are bidirectional hollow cone nozzle or unidirectional hollow cone nozzle with an Archimedean spiral structure; and Further preferably, when the first-section nozzle, the second-section nozzle, and the third-section nozzle use the Archimedean spiral structure, a total of 32 nozzles are arranged in a circumferential direction, and the nozzles are five-head nozzle with pore diameter of 0.8 mm. The small-particle-size multi-head nozzle for high-density spray has the advantages of compact structure, high atomization degree, high universality, which implements the homogenization of liquid, and meets requirements of practical application.

In view of the problems such as absorbent loss and secondary pollutants caused by the generation of aerosols in the process of carbon dioxide absorption. In reference to environmental features in the absorption tower, the fourth-section nozzle is preferably an efficiently-atomizing bidirectional hollow cone nozzle or unidirectional hollow cone nozzle, which removes fine particles of original flue gas and inhibits the entrainment of the fine-particle absorption liquid. In reference to characteristics of the influence of parameters such as flue gas supersaturation, temperature drop, and residence time on condensation of supersaturated steam, condensation and growth of an escaping absorbent, the relationship between flue gas flow field structure at the top of the absorption tower, collision and coalescence characteristics of particles, organic amine aerosols, and fog drops is analyzed. The turbulence device is disposed between the first demister and the fourth-stage washing system (section) to form a turbulent flow field to promote the collision and coalescence of the organic amine aerosols and the fog drops, which enhances efficient removal of pollutants such as the organic amine aerosols.

Preferably, the carbon dioxide desorption tower comprises desorption heater, desorption tower nozzle, desorption tower packing layer, desorption tower gas lifting cap and desorption tower partition plate that are sequentially arranged from top to bottom; the desorption tower partition plate, the desorption heater, and the bottom of the carbon dioxide desorption tower communicate with each other; and second demister is disposed at the top of the carbon dioxide desorption tower.

The heat source for desorption heating comes from extracted gas of an intermediate pressure cylinder of a steam turbine.

The use of the composite catalyst reduces activation energy of carbamate formation and decomposition, reduces regeneration reaction time, makes energy distribution more concentrated, and greatly improves energy efficiency; and the improvement of the absorbent and the use of the characteristic catalyst greatly reduce an overall heat load of catalytic desorption of carbon dioxide by an amine solution.

Preferably, the composite catalyst is one or more of a $\gamma$-$Al_2O_3$/zeolite molecular sieve, an $SO_4^{2-}$/$ZrO_2$-zeolite molecular sieve, a shell-coated $SO_4^{2-}$/$ZrO_2$-zeolite molecular sieve, shell-coated $SO_4^{2-}$/$ZrO_2$—$TiO_2$, shell-coated $SO_4^{2-}$/$CoO$—$TiO_2$, and the like.

Preferably, the carbon dioxide concentration device comprises cooling device and gas-liquid separator; and the cooling device and the gas-liquid separator constitute a cycle with the top of the carbon dioxide desorption tower.

Preferably, the slurry cleaning device is disposed downstream of the rich solution and lean solution heat exchanger; and the slurry cleaning device comprises an ion exchanger and a filter. The lean solution enters the ion exchanger in the slurry cleaning device, and the ion exchange resin is used to remove metal ions in the absorption liquid, so that the absorption liquid can be regenerated repeatedly, and has a long working life and low operating cost; and then the absorption liquid enters the filter in the slurry cleaning device to remove insoluble impurities in the absorption liquid.

The rich solution and lean solution heat exchanger connects the multistage circulating absorption tower to the carbon dioxide desorption tower. After the rich solution of the first-stage carbon dioxide absorption system passes through the rich solution pump and then enters the rich solution and lean solution heat exchanger for heat exchange, the rich solution communicates with the desorption tower nozzle on an upper portion of the carbon dioxide desorption tower. After the lean solution at the bottom of the carbon dioxide desorption tower passes through the lean solution pump and then enters the rich solution and lean solution heat exchanger for heat exchange, the lean solution enters the slurry cleaning device and then communicates with the third-section circulating cooler, and enters the third-stage carbon dioxide absorption system.

Preferably, fresh softened water is injected into the fourth-section circulating tank, and enters the multistage circulating absorption tower through the fourth-stage circulating pump, the fourth-section circulating cooler, and the fourth-section nozzle, the liquid-gas ratio is 0.5-2.0, and the fresh softened water falls to the third partition plate after being in reverse contact with the flue gas through the fourth-section packing layer, and circulates to the fourth-section circulating tank;

Fresh absorbent is injected into the third-section circulating tank, and enters the multistage circulating absorption tower through the third-stage circulating pump, the third-section circulating cooler, and the third-section nozzle, the liquid-gas ratio is 1.0-2.0, and the fresh absorbent falls to the third partition plate after being in reverse contact with the flue gas through the third-section packing layer, and circulates to the third-section circulating tank; after the liquid level in the third-section circulating tank reaches a certain height, the absorbent overflows to the second-section circulating tank;

The absorbent overflowing from the third-section circulating tank is injected into the second-section circulating tank, and enters the multistage circulating absorption tower through the second-section circulating pump, the second-section circulating cooler, and the second-section nozzle, the liquid-gas ratio is 1.0-2.5, and the absorbent falls to the second partition plate after being in reverse contact with the flue gas through the second-section packing layer, and circulates to the second-section circulating tank; after a liquid level in the second-section circulating tank reaches a certain height, the absorbent overflows to the slurry tank; and The absorbent overflowing from the second-section circulating tank is injected into the slurry tank, and enters the multistage circulating absorption tower through the rich solution pump, the first-section circulating cooler, and the first-section nozzle, the liquid-gas ratio is 0.6-2.0, and the absorbent falls to the slurry tank after being in reverse contact with the flue gas through the first-section packing layer; and after the liquid level in the slurry tank reaches the certain height, the saturated rich solution enters the rich solution and lean solution heat exchanger through the rich solution pump and then enters the carbon dioxide desorption tower.

Cooling water of the first-section circulating cooler, the second-section circulating cooler, the third-section circulating cooler, and the fourth-section circulating cooler comes from desalinated water tank, and cooling water after heat exchange supplements feed water for the heating boiler.

Softened water circulates in the fourth-stage washing system, and the softened water is supplemented to the fourth-section circulating tank. The fourth-section circulating tank is an overflow circulating tank, and when the water level rises to maximum water level, the softened water overflows to the third-section circulating tank.

The absorbent circulates in the third-stage carbon dioxide absorption system, and the absorbent is supplemented to the third-section circulating tank. The softened water comes from the fourth-section circulating tank. The third-section circulating tank is an overflow circulating tank, and when the liquid level rises to maximum liquid level, the absorbent overflows to the second-section circulating tank.

The absorbent circulates in the second-stage carbon dioxide absorption system, and the absorbent of the third-section circulating tank overflows to the second-section circulating tank. The second-section circulating tank is an overflow circulating tank, and when the liquid level rises to maximum liquid level, the absorbent overflows to the slurry tank of the multistage circulating absorption tower.

The absorbent circulates in the first-stage carbon dioxide absorption system, and the absorbent of the second-section circulating tank overflows to the slurry tank of the multistage circulating absorption tower.

Preferably, the method for carbon dioxide capture and concentration by partitioned multistage circulation based on mass transfer-reaction regulation comprises the following steps:

(1) introducing flue gas into the pre-washing section, and cooling to 38-41° C.;

introducing the flue gas into the first-stage carbon dioxide absorption system, and causing the flue gas to sequentially pass through the first-section packing layer, first-section nozzle, and first partition plate, decarburization efficiency being 35%-45%; making an absorbent circulate in the first-stage carbon dioxide absorption system at 48-60° C., with the pH controlled at 7.5-9.0; injecting the absorbent overflowing from the second-section circulating tank into the slurry tank, and introducing the absorbent into the multistage circulating absorption tower through rich solution pump, first-section circulating cooler, and the first-section nozzle, the liquid-gas ratio being 0.5-2.0; causing the absorbent to fall to the slurry tank after the absorbent is in reverse contact with the flue gas through the first-section packing layer; and after the liquid level in the slurry tank reaches a certain height, introducing the saturated rich solution into the rich solution and lean solution heat exchanger through the rich solution pump and then introducing the saturated rich solution into the carbon dioxide desorption tower;

introducing the flue gas into the second-stage carbon dioxide absorption system, and causing the flue gas to sequentially pass through the second-section packing layer, second-section nozzle, and second partition plate, decarburization efficiency being 77%-85%; making the absorbent circulate in the second-stage carbon dioxide absorption system at 44-55° C., with the pH controlled at 8.0-10.0; injecting the absorbent overflowing from the third-section circulating tank into the second-section circulating tank, and introducing the absorbent into the multistage circulating absorption tower through second-section circulating pump, second-section circulating cooler, and the second-section nozzle, the liquid-gas ratio being 1.0-2.5; after the absorbent is in reverse contact with the flue gas through the second-section packing layer, causing the absorbent to fall to the first partition plate, and circulate to the second-section circulating tank; and after the liquid level in the second-section circulating tank reaches a certain height, overflowing to the slurry tank;

introducing the flue gas into the third-stage carbon dioxide absorption system, and causing the flue gas to sequentially pass through the third-section packing layer, third-section nozzle, and third partition plate, decarburization efficiency being 86%-98%; making the absorbent circulate in the third-stage carbon dioxide absorption system at 40-50° C., with the pH controlled at 9.5-11.5; injecting fresh absorbent into the third-section circulating tank, and introducing the absorbent into the multistage circulating absorption tower through third-section circulating pump, third-section circulating cooler, and the third-section nozzle, the liquid-gas ratio being 1.0-2.0; after the absorbent is in reverse contact with the flue gas through the third-section packing layer, causing the absorbent to fall to the second partition plate, and circulate to the third-section circulating tank; and after the liquid level in the third-section circulating tank reaches a certain height, overflowing to the second-section circulating tank; and introducing the flue gas into the fourth-stage washing system, causing the flue gas to sequentially pass through the fourth-section packing layer and fourth-section nozzle, decarburization efficiency being 99% or above, and causing the flue gas to pass through first demister and then discharging the flue gas to the atmosphere; making softened water circulate in the fourth-stage washing system at 40-50° C., with the pH controlled at 8.5-10.0; injecting fresh softened water into a fourth-section circulating tank, and introducing the fresh softened water into the multistage circulating absorption tower through fourth-section circulating pump, fourth-section circulating cooler, and the fourth-section nozzle, the liquid-gas ratio being 0.5-1.5; and after the softened water is in reverse contact with the flue gas through the fourth-section packing layer, causing the softened water to fall to the third partition plate, and circulate to the fourth-section circulating tank;

(2) heating the rich solution through the rich solution and lean solution heat exchanger to 90-98° C. and then introducing the rich solution into the carbon dioxide desorption tower; causing the rich solution to fall into the desorption tower partition plate through the desorption tower nozzle and desorption tower packing layer, and circulate to the desorption heater; after the absorption liquid is heated to 105-115° C., discharging the lean solution outer of the carbon dioxide desorption tower, and introducing the lean solution to the rich solution and lean solution heat exchanger for cooling to 60-68° C.; introducing high-temperature carbon dioxide-rich steam into the desorption tower packing layer through the desorption tower gas lifting cap, and introducing the steam into a carbon dioxide concentration device through second demister; the heat source of the desorption heater coming from extracted gas of the intermediate pressure cylinder of the steam turbine at 160-200° C., and cooling the gas to 120-130° C. and making the gas return to water tank;

(3) introducing regenerated gas from the carbon dioxide desorption tower into the carbon dioxide concentration device, cooling the regenerated gas by cooler to the boiling point of carbon dioxide or below, and introducing the regenerated gas into gas-liquid separator to obtain high-purity carbon dioxide; and (4) connecting the intelligent regulation system to each stage of circulating system, and performing multifactor regulation based on the system for carbon dioxide absorption by partitioned multistage circulation, which comprises the following steps:

I: establishing a database comprising multi-device multi-scale inlet/outlet flue gas parameters, reaction liquid parameters, and desorption energy consumption parameters based on online monitoring and offline data and device design parameters, wherein the parameters comprise, but are not limited to, the flue gas flow rate G, partial pressures $p_{CO_2,out}$ and $p_{CO_2,in}$ of carbon dioxide at the flue gas inlet and outlet, an absorbent concentration $c_{ab}$, and pH, temperature T and circulation quantity L of $(1-n)^{th}$ stages of circulating liquids;

II: based on mechanism research and the parameter database, obtaining a relationship between desorption energy consumption and the pH, temperature and circulation quantity in each stage, constructing the key parameter model of multi-factor regulation over the absorption-desorption process under collaborative driving by the mechanism of a system for carbon dioxide capture and concentration by partitioned multistage circulation and the data, studying key indexes of efficiency, energy consumption, and material consumption in the state of partitioned multistage circulating operation, and constructing the comprehensive cost model of energy consumption and material consumption of the system for carbon dioxide capture and concentration by partitioned multistage circulation;

wherein the key parameter model of multi-factor regulation over the absorption-desorption process is as follows:

$$p_{CO_2,out} = f(pH_{1-n}, T_{1-n}, L_{1-n}, G, p_{CO_2,in}, L_{i-n}, c_{ab}); \text{ and}$$

the comprehensive cost model of energy consumption and material consumption is as follows:

$$COST_{ccs} = COST_{steam} + COST_{cp} + COST_{lp} + COST_{rp} + COST_{ier} + COST_w + COST_{ab} - R_{CO_2} + COST_f$$

III: constructing the global optimization parameter model of the system for carbon dioxide capture and concentration by partitioned multistage circulation under an variable load/working condition based on efficiency, energy consumption and material consumption analysis by using the established model under the collaborative driving by the absorption-desorption mechanism and the data as well as the comprehensive cost model of energy consumption and material consumption, accurately evaluating in real time dynamic operating cost of the entire absorption-desorption process of the system for carbon dioxide capture and concentration under different working conditions, establishing a cost effectiveness optimization problem of the system for carbon dioxide capture and concentration by partitioned multistage circulation, and solving the problem by using intelligent optimization algorithms such as particle swarm optimization and ant colony optimization to obtain a parameter combination for an optimal comprehensive cost of energy consumption and material consumption, wherein the cost effectiveness optimization problem of the system for carbon dioxide capture and concentration by partitioned multistage circulation is as follows:

$$minCOST_{ccs} = COST_{steam} + COST_{cp} + COST_{lp} + COST_{rp} + COST_{ier} + COST_w + COST_{ab} - R_{CO_2} + COST_f$$

$$s.t. \begin{cases} \eta_{ccs} \geq 90\% \\ pH_{i,max} \geq pH_i \geq pH_{i,min}, i\epsilon[1,n] \\ T_{i,max} \geq T_i \geq T_{i,min}, i\epsilon[1,n] \\ L_{i,max} \geq L_i \geq L_{i,min}, i\epsilon[1,n] \end{cases};$$

and

IV: after the parameter combination for the optimal comprehensive cost of energy consumption and material consumption is obtained, using advanced control methods such as predictive control and fuzzy control to implement real-time, accurate and stable control over parameters by using the parameter combination as a control objective, to ensure that efficiency of the system for carbon dioxide capture and concentration reaches a standard steadily, and optimize energy consumption and material consumption.

Compared with the prior art, the present invention has the following beneficial effects:

1. A partitioned multistage circulation absorption tower is used, so that its advantage of high carbon dioxide capture efficiency is brought into play, and the carbon dioxide carbon dioxide absorption capacity is greatly increased. n-stage circulation is used to remove aerosols from top to bottom in sequence, which improves carbon capture efficiency, maintains the absorption rate, concentrates the amine solution, and separately regulates the absorption section and desorption section, so that the carbon capture rate can reach 99% or above. The flow of absorption liquid into the desorption tower is reduced, and carbon dioxide desorption is enhanced under the coupling action of a plurality of fields such as a thermal field, an ultrasonic field, and an electric field. In addition, composite catalyst is used to catalyze stable carbon dioxide desorption by the rich solution with low energy consumption, so that the overall desorption energy consumption is not higher than 1.8 GJ/t $CO_2$, and the capture cost is reduced by 30% or above.

2. The parameter database is established based on the intelligent regulation system, and the key parameter model of multi-factor regulation and the global optimization parameter model of system for carbon dioxide absorption by partitioned multistage circulation are obtained. Parameters such as pH, temperature, conductivity, and density are monitored in real time. When the desorption energy consumption increases or the carbon dioxide capture efficiency decreases, based on the key parameter model of multi-factor regulation, rolling optimization and feedback correction are performed to make the desorption energy consumption and carbon dioxide capture efficiency return to the normal range, so as to implement a high concentration of the rich solution, efficient carbon dioxide capture, significant reduction of the desorption energy consumption and efficient inhibition of secondary pollutants.

3. The pre-washing device is arranged between an outlet of a wet desulfurization tower (50-65° C.) and an inlet of the carbon dioxide absorption tower. The temperature in this section is 50-65° C., which does not facilitate the absorption of carbon dioxide, and the volatilization and entrainment quantity of the absorption liquid at high temperature is greater. Flue gas further contains impurities such as fly ash, gypsum particles, $SO_2$, $SO_3$, HCl, and NON, and strong acid gases react with the absorption liquid prior to carbon dioxide to generate stable salts, which are difficult to decompose and regenerate, resulting in a rapid decrease in the performance of the absorption liquid. In view of the foregoing problems, the pre-washing device in the present invention suitable for carbon capture in exhaust gas of coal-fired units reduces a loss of the absorption liquid in the absorption process, inhibits the transfer of impurities in the flue gas to the absorption liquid, ensures that the absorption liquid can be recycled efficiently, reduces an operation cost, and solves the problems such as abnormal operation of the capture system caused by improper pretreatment.

4. Temperature regulation of different levels of absorption liquid keeps the absorption tower in the optimal range of carbon dioxide absorption temperature, multistage cooling makes the temperature distribution in the tower more reasonable, and increasing the absorption capacity of carbon dioxide can also reduce the size of the absorption tower. In addition, an optimal design of uniform distribution of the flow field in the whole process is adopted for the absorption tower and the desorption tower, and the pressure drop of the desorption tower is reduced by 5% or above compared with that of a conventional desorption tower.

5. An nth-stage washing system is added, which can control discharge of secondary pollutants from a magnitude of 1000 $mg/m^3$ to a magnitude of 10 $mg/m^3$.

6. A slurry cleaning device is added to prevent system scaling and absorbent degradation. The ion exchanger and the filter remove insoluble impurities and metal ions in the absorption liquid, so that the absorption liquid can be regenerated repeatedly, and has a long working life and low operating cost.

7. Waste heat of circulating cooling water is reused, and the cooling water after heat exchange supplements feed water for the heating boiler, which improves economic benefits of a power plant.

8. The small-particle-size multi-head nozzle is used for high-density spray, and the circular tube has an Archimedean spiral structure and has the advantages of compact structure, high atomization degree, high universality, which implements the homogenization of liquid, and meets requirements of practical application.

DETAILED DESCRIPTION OF THE INVENTION

The present invention is further described below with reference to specific embodiments, but the protection scope of the present invention is not limited thereto. A person of ordinary skill in the art may and should understand that any simple change or replacement based on the essential spirit of the present invention should fall within the protection scope required by the present invention.

Embodiment 1

Figure 1:
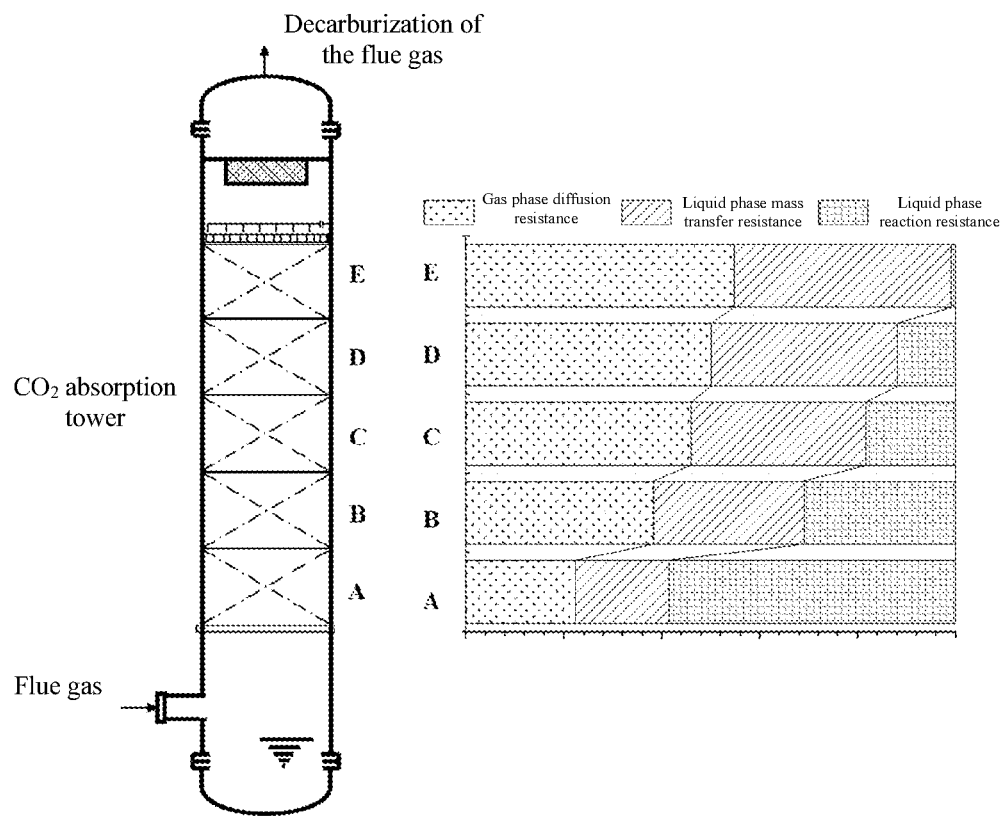
FIG. 1 is the schematic diagram of resistance analysis of the carbon dioxide absorption tower at different tower heights.
Figure 2:
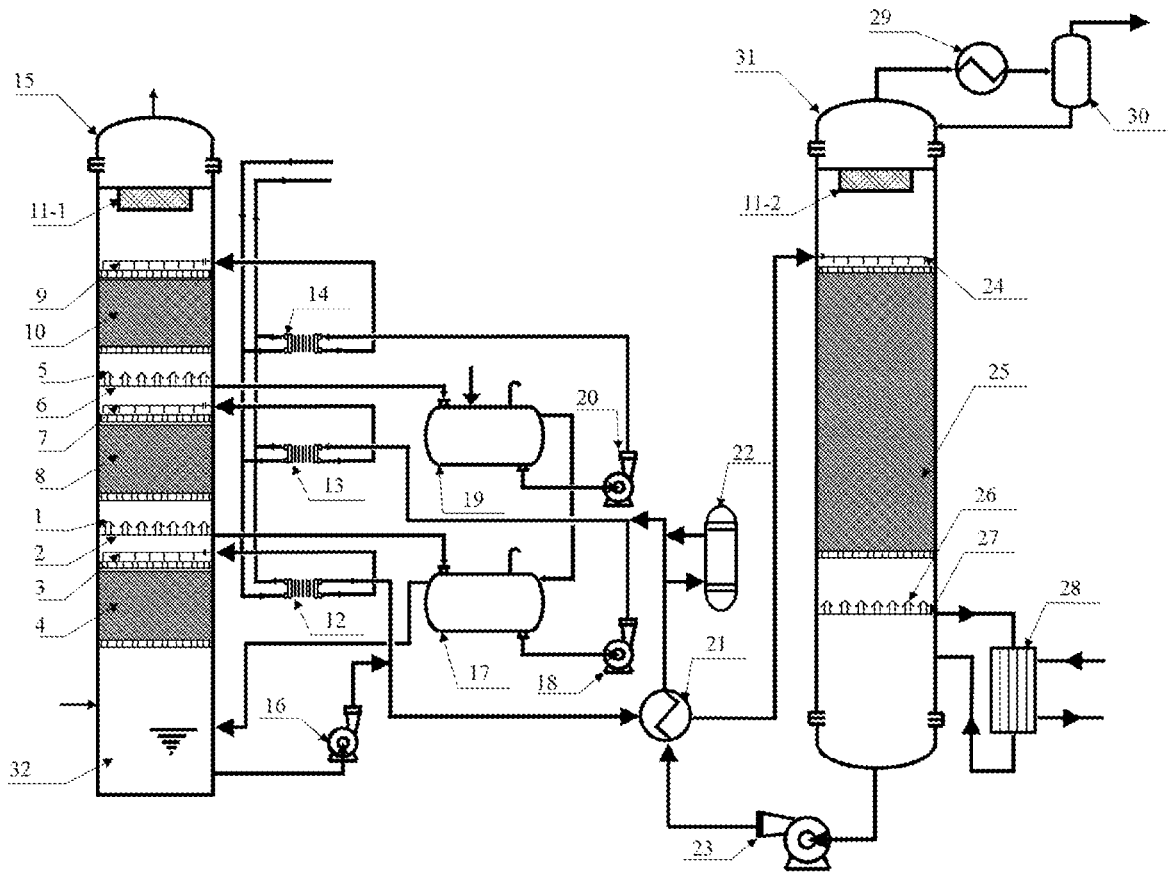
FIG. 2 is the process flowchart of three-stage circulation.

Referring to FIG. 2, in a method for carbon dioxide capture and concentration by partitioned multistage circulation based on mass transfer-reaction regulation, a system for carbon dioxide capture and concentration is adopted. The system for carbon dioxide capture and concentration comprises a multistage circulating absorption tower 15, a rich solution and lean solution heat exchanger 21, a slurry cleaning device 22, a carbon dioxide desorption tower 31, and a carbon dioxide concentration device.

The multistage circulating absorption tower 15 comprises a first-stage carbon dioxide absorption system, a second-stage carbon dioxide absorption system, and a third-stage washing system. The first-stage carbon dioxide absorption system, the second-stage carbon dioxide absorption system, and the third-stage washing system are connected in series stage by stage from bottom to top, and a first demister 11-1 is disposed at the top of the multistage circulating absorption tower 15.

Flue gas enters the first-stage carbon dioxide absorption system, and sequentially passes through a first-section packing layer 4, a first-section nozzle 3, a first partition plate 2, and a first gas lifting cap 1, and decarburization efficiency is 35%; an absorbent circulates in the first-stage carbon dioxide absorption system at 52° C., with the pH controlled at 8.0; an absorbent overflowing from a second-section circulating tank 17 is injected into a slurry tank 32, and enters the multistage circulating absorption tower 15 through a rich solution pump 16, a first-section circulating cooler 12, and the first-section nozzle 3, and a liquid-gas ratio is 0.86; and the absorbent falls into the slurry tank 32 after being in reverse contact with the flue gas through the first-section packing layer 4. After a liquid level in the slurry tank 32 reaches a certain height, a saturated rich solution enters the rich solution and lean solution heat exchanger 21 through the rich solution pump 16 and then enters the carbon dioxide desorption tower 31.

The flue gas enters the second-stage carbon dioxide absorption system, and sequentially passes through a second-section packing layer 8, a second-section nozzle 7, a second partition plate 6, and a second gas lifting cap 5, and decarburization efficiency is 85%; an absorbent circulates in the second-stage carbon dioxide absorption system at 46° C., with the pH controlled at 9.3; an absorbent overflowing from a third-section circulating tank 19 is injected into the second-section circulating tank 17, and enters the multistage circulating absorption tower 15 through a second-section circulating pump 18, a second-section circulating cooler 13, and the second-section nozzle 7, and a liquid-gas ratio is 1.3; and the absorbent falls to the first partition plate 2 after being in reverse contact with the flue gas through the second-section packing layer 8, and circulates to the second-section circulating tank 17. After a liquid level in the second-section circulating tank 17 reaches a certain height, the absorbent overflows to the slurry tank 32.

The flue gas enters the third-stage washing system, and sequentially passes through a third-section packing layer 10 and a third-section nozzle 9, aerosol removal efficiency is 95% or above, and the flue gas passes through the first demister 11-1 and then is discharged to the atmosphere; softened water circulates in the third-stage washing system at 41° C., with the pH controlled at 9.2; fresh softened water is injected into the third-section circulating tank 19, and enters the multistage circulating absorption tower 15 through a third-section circulating pump 20, a third-section circulating cooler 14, and the third-section nozzle 9, and a liquid-gas ratio is 0.6; and after being in reverse contact with the flue gas through the third-section packing layer 10, the softened water falls to the second partition plate 6, and circulates to the third-section circulating tank 19.

Figure 3:
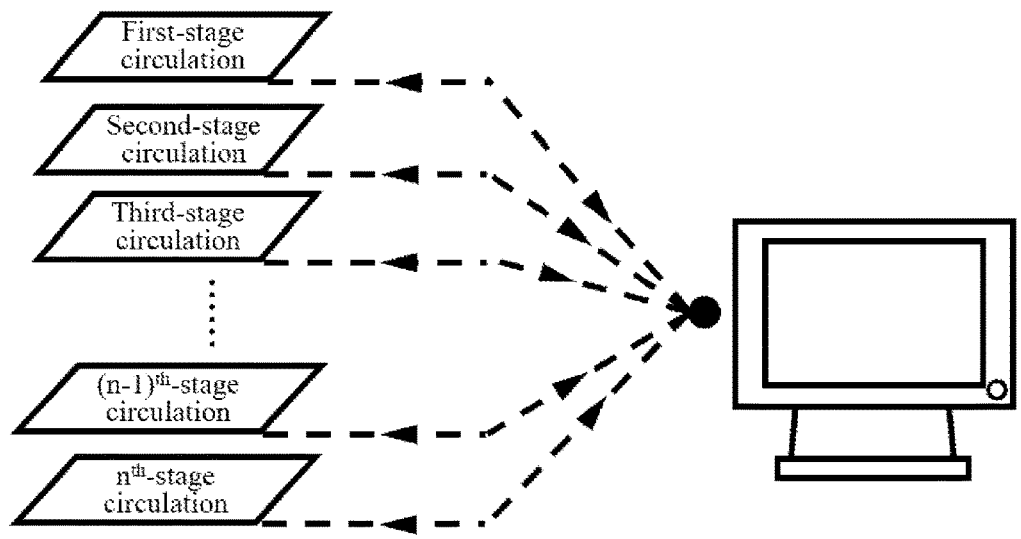
FIG. 3 is the control principle diagram of the intelligent regulation system.

Referring to FIG. 3, the intelligent regulation system is connected to the first-stage carbon dioxide absorption system (first-stage circulation), the second-stage carbon dioxide absorption system (second-stage circulation), and the third-stage washing system (third-stage circulation), models and optimizes desorption energy consumption and carbon dioxide capture efficiency based on real-time operation parameters, and regulates the operation parameters to be optimal. Signals received by the intelligent regulation system come from the slurry tank 32, the rich solution pump 16, the second-section circulating tank 17, the second-section circulating pump 18, the third-section circulating tank 19, and the third-section circulating pump 20. The following steps are included:

I: establishing a database covering parameters such as multi-device multi-scale inlet/outlet flue gas parameters, reaction liquid parameters, and desorption energy consumption parameters based on online monitoring and offline data and device design parameters, comprising, but not limited to, a flue gas flow rate G, partial pressures $p_{CO_n,out}$ and $p_{CO_n,in}$ of $CO_2$ at a glue gas inlet and outlet, an absorbent concentration $c_{ab}$, and pH, temperature T and circulation quantity L of 1-n stages of circulating liquids;

II: based on mechanism research and the parameter database, obtaining a relationship between desorption energy consumption and the pH, temperature and circulation quantity in each stage, constructing a key parameter model of multi-factor regulation over an absorption-desorption process under collaborative driving by the mechanism of a system for carbon dioxide capture and concentration by partitioned multistage circulation and the data, studying key indexes of efficiency, energy consumption, and material consumption in a state of partitioned multistage circulating operation, and constructing a comprehensive cost model of energy consumption and material consumption of the system for carbon dioxide capture and concentration by partitioned multistage circulation;

wherein the key parameter model of multi-factor regulation over an absorption-desorption process is as follows:

$$p_{CO_2,out} = f(pH_{1-n}, T_{1-n}, L_{1-n}, G, p_{CO_2,in}, L_{i-n}, c_{ab})$$

and the comprehensive cost model of energy consumption and material consumption is as follows:

$$COST_{ccs} = COST_{steam} + COST_{cp} + COST_{lp} + COST_{rp} + COST_{ier} + COST_w + COST_{ab} - R_{CO_2} + COST_f$$

III: constructing a global optimization parameter model of the system for carbon dioxide capture and concentration by partitioned multistage circulation under an variable load/working condition based on efficiency, energy consumption and material consumption analysis by using the established model under the collaborative driving by the absorption-desorption mechanism and the data as well as the comprehensive cost model of energy consumption and material consumption, accurately evaluating in real time a dynamic operating cost of the entire absorption-desorption process of the system for carbon dioxide capture and concentration under different working conditions, establishing a cost effectiveness optimization problem of the system for carbon dioxide capture and concentration by partitioned multistage circulation, and solving the problem by particle swarm and intelligent ant colony optimization algorithms to obtain a parameter combination for an optimal comprehensive cost of energy consumption and material consumption, wherein the cost effectiveness optimization problem of the system for carbon dioxide capture and concentration by partitioned multistage circulation is as follows:

$$\min COST_{ccs} = COST_{steam} + COST_{cp} + COST_{lp} + COST_{rp} + COST_{ier} + COST_w + COST_{ab} - R_{CO_2} + COST_f$$

$$\text{s.t.} \begin{cases} \eta_{ccs} \geq 90\% \\ pH_{i,max} \geq pH_i \geq pH_{i,min}, i\epsilon[1,n] \\ T_{i,max} \geq T_i \geq T_{i,min}, i\epsilon[1,n] \\ L_{i,max} \geq L_i \geq L_{i,min}, i\epsilon[1,n] \end{cases};$$

and

IV: after the parameter combination for the optimal comprehensive cost of energy consumption and material consumption is obtained, using advanced control methods such as predictive control and fuzzy control to implement real-time, accurate and stable control over parameters by using the parameter combination as a control objective, to ensure that efficiency of the system for carbon dioxide capture and concentration reaches a standard steadily, and optimize energy consumption and material consumption.

Figure 4:
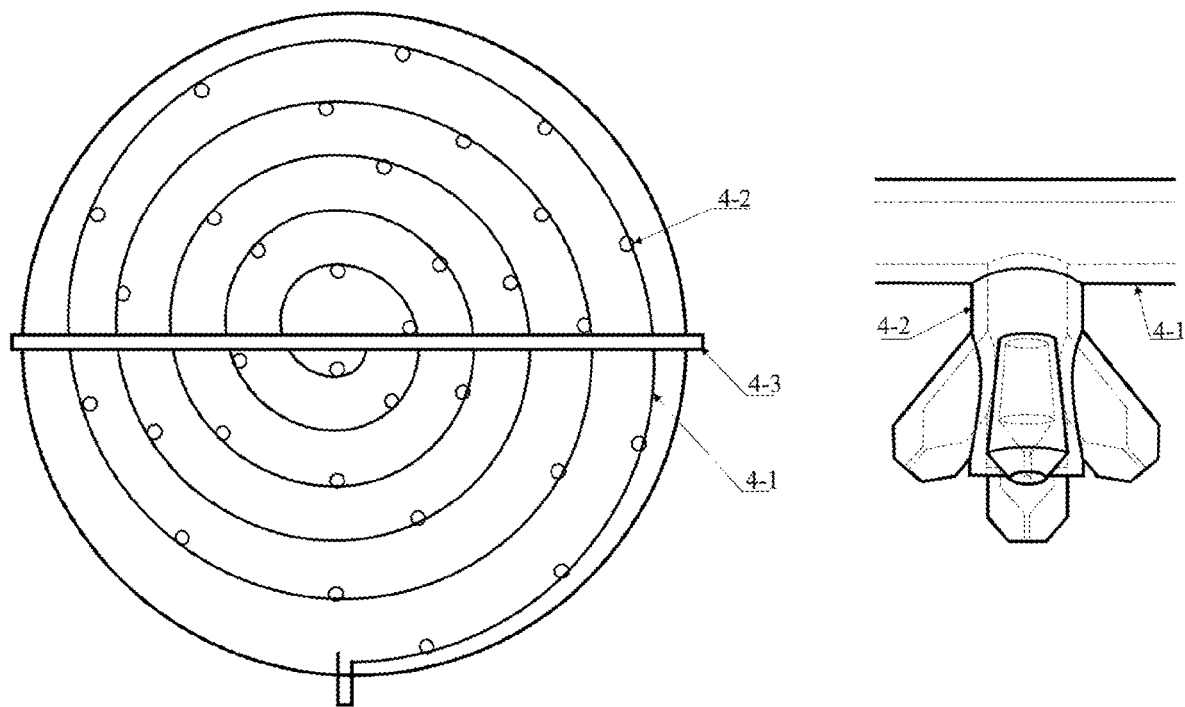
FIG. 4 is the schematic structural diagram of the nozzle with an Archimedean spiral structure.

Referring to FIG. 4, the first-section nozzle, the second-section nozzle and the third-section nozzle each have an Archimedean spiral structure, and a circular tube 4-1 has an Archimedean spiral structure. A total of 32 nozzles 4-2 are arranged in a circumferential direction, and the nozzles 4-2 are each a five-head nozzle with a small particle size and a pore diameter of 0.8 mm. The small-particle-size multi-head nozzle for high-density spray has the advantages of a compact structure, a high atomization degree, high universality, and the like, implements the homogenization of liquid, and meets requirements of practical application. A fourth-section nozzle is a unidirectional hollow cone nozzle. Cooling water of the first-section circulating cooler, the second-section circulating cooler, and the third-section circulating cooler comes from a desalinated water tank, and cooling water after heat exchange supplements feed water for a heating boiler.

The rich solution is heated to 97° C. through the rich solution and lean solution heat exchanger 21 and then enters the carbon dioxide desorption tower 31, falls into a desorption tower partition plate 27 through a desorption tower nozzle 24 and a desorption tower packing layer 25, and circulates to a desorption heater 28. After the absorption liquid is heated to 107° C., the lean solution is discharged out of the carbon dioxide desorption tower 31 and enters the rich solution and lean solution heat exchanger 21 for cooling to 63° C. High-temperature carbon dioxide-rich steam enters the desorption tower packing layer 25 through a desorption tower gas lifting cap 26, and enters the carbon dioxide concentration device through a second demister 11-2. A heat source of the desorption heater 28 comes from extracted gas of an intermediate pressure cylinder of a steam turbine at 180° C., and the gas is cooled to 128° C. and returns to a water tank.

Regenerated steam of the carbon dioxide desorption tower 31 enters the carbon dioxide concentration device, is cooled by a cooler 29 to a boiling point of carbon dioxide or below, and enters a gas-liquid separator 30 to obtain high-purity carbon dioxide.

The rich solution and lean solution heat exchanger 21 connects the multistage circulating absorption tower 15 to the carbon dioxide desorption tower 31. After the rich solution of the first-stage carbon dioxide absorption system passes through the rich solution pump 16 and then enters the rich solution and lean solution heat exchanger 21 for heat exchange, the rich solution communicates with the desorption tower nozzle 24 on an upper portion of the carbon dioxide desorption tower 31. After the lean solution at the bottom of the carbon dioxide desorption tower 31 passes through a lean solution pump 23 and then enters the rich solution and lean solution heat exchanger 21 for heat exchange, the lean solution enters the slurry cleaning device 22 and then communicates with the second-section circulating cooler 13, and enters the second-stage carbon dioxide absorption system.

The slurry cleaning device 22 is disposed downstream of a lean solution section of the rich solution and lean solution heat exchanger 21, and the slurry cleaning device comprises an ion exchanger and a filter. The lean solution enters the ion exchanger in the slurry cleaning device, and an ion exchange resin is used to remove metal ions in the absorption liquid, so that the absorption liquid can be regenerated repeatedly, and has a long working life and a lower operating cost; and then the absorption liquid enters the filter in the slurry cleaning device to remove insoluble impurities in the absorption liquid.

After the flue gas with the flue gas quantity of 5000 m$^3$/h is treated by the foregoing system, the decarburizing efficiency is 95%; and the desorption energy consumption is less than 2.2 GJ/t CO$_2$.

Embodiment 2

Figure 5:
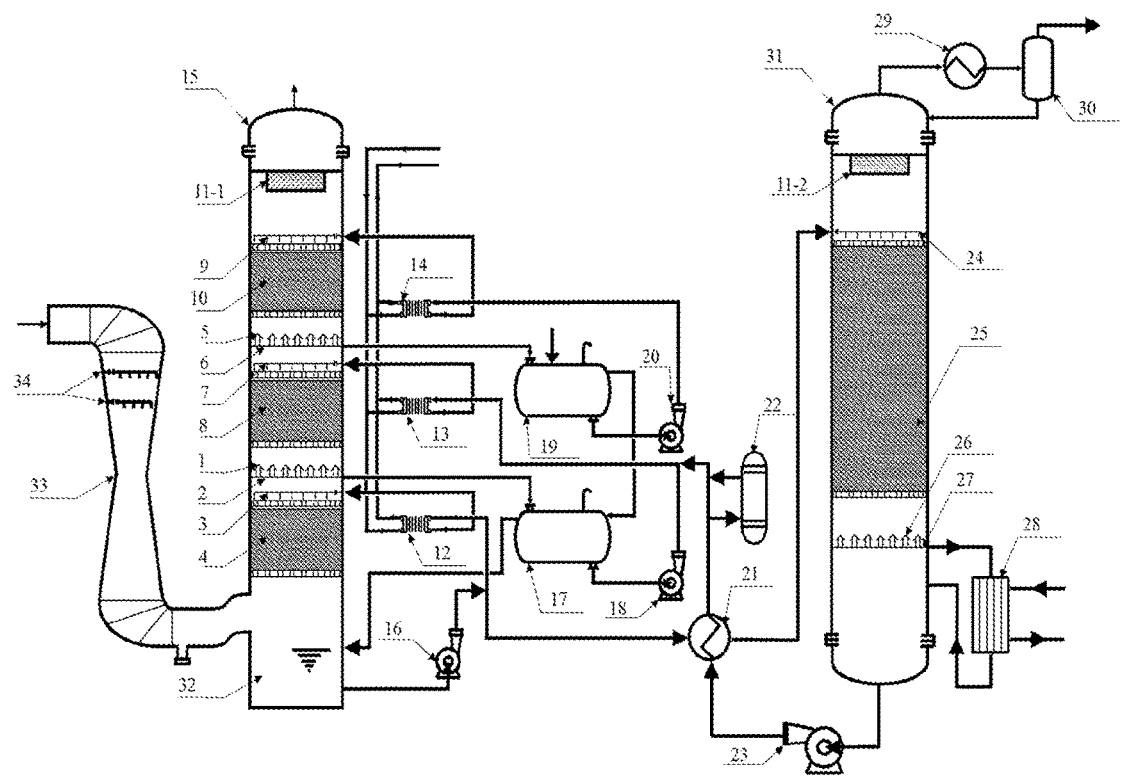
FIG. 5 is the process flowchart of three-stage circulation with venturi pre-washing section.

Referring to FIG. 5, in a method for carbon dioxide capture and concentration by partitioned multistage circulation based on mass transfer-reaction regulation, a system for carbon dioxide capture and concentration is adopted. The system for carbon dioxide capture and concentration comprises a multistage circulating absorption tower 15, a rich solution and lean solution heat exchanger 21, a slurry cleaning device 22, a carbon dioxide desorption tower 31, and a carbon dioxide concentration device.

The multistage circulating absorption tower 15 comprises a venturi pre-washing section 33, a first-stage carbon dioxide absorption system, a second-stage carbon dioxide absorption system, and a third-stage washing system. The first-stage carbon dioxide absorption system, the second-stage carbon dioxide absorption system, and the third-stage washing system are connected in series stage by stage from bottom to top, and a first demister 11-1 is disposed at the top of the multistage circulating absorption tower 15.

The venturi pre-washing section 33 is disposed in the front of the multistage circulating absorption tower 15, and communicates with the first-stage carbon dioxide absorption system. Washing, impurity removal and cooling water of the pre-washing section is preferably softened water, which is sprayed by a high-efficiency atomizing nozzle 34, and the washing, impurity removal and cooling water is recycled, and regularly discharged to a wet desulfurization slurry-preparing system as slurry preparing water.

Flue gas enters the venturi pre-washing section 33 and is cooled to 42° C.

The flue gas enters the first-stage carbon dioxide absorption system, and sequentially passes through a first-section packing layer 4, a first-section nozzle 3, a first partition plate 3-2, and a first gas lifting cap 1, and decarburization efficiency is 39%; an absorbent circulates in the first-stage carbon dioxide absorption system at 52° C., with the pH controlled at 8.0; an absorbent overflowing from a second-section circulating tank 17 is injected into a slurry tank 32, and enters the multistage circulating absorption tower 15 through a rich solution pump 16, a first-section circulating cooler 12, and the first-section nozzle 3, and a liquid-gas ratio is 0.86; and the absorbent falls into the slurry tank 32 after being in reverse contact with the flue gas through the first-section packing layer 4. After a liquid level in the slurry tank 32 reaches a certain height, a saturated rich solution enters the rich solution and lean solution heat exchanger 21 through the rich solution pump 16 and then enters the carbon dioxide desorption tower 31.

The flue gas enters the second-stage carbon dioxide absorption system, and sequentially passes through a second-section packing layer 8, a second-section nozzle 7, a second partition plate 6, and a second gas lifting cap 5, and decarburization efficiency is 89%; an absorbent circulates in the second-stage carbon dioxide absorption system at 46° C., with the pH controlled at 9.3; an absorbent overflowing from a third-section circulating tank 19 is injected into the second-section circulating tank 17, and enters the multistage circulating absorption tower 15 through a second-section circulating pump 18, a second-section circulating cooler 13, and the second-section nozzle 7, and a liquid-gas ratio is 1.3; and the absorbent falls to the first partition plate 2 after being in reverse contact with the flue gas through the second-section packing layer 8, and circulates to the second-section circulating tank 17. After a liquid level in the second-section circulating tank 17 reaches a certain height, the absorbent overflows to the slurry tank 32.

The flue gas enters the third-stage washing system, and sequentially passes through a third-section packing layer 10 and a third-section nozzle 9, aerosol removal efficiency is 97% or above, and the flue gas passes through the first demister 11-1 and then is discharged to the atmosphere; softened water circulates in the third-stage washing system at 41° C., with the pH controlled at 9.2; fresh softened water is injected into the third-section circulating tank 19, and enters the multistage circulating absorption tower 15 through a third-section circulating pump 20, a third-section circulating cooler 14, and the third-section nozzle 9, and a liquid-gas ratio is 0.6; and after being in reverse contact with the flue gas through the third-section packing layer 10, the softened water falls to the second partition plate 6, and circulates to the third-section circulating tank 19.

Referring to FIG. 3, the intelligent regulation system is connected to the first-stage carbon dioxide absorption system, the second-stage carbon dioxide absorption system, and the third-stage washing system, models and optimizes desorption energy consumption and carbon dioxide capture efficiency based on real-time operation parameters, and regulates the operation parameters to be optimal. Signals received by the intelligent regulation system come from the slurry tank 32, the rich solution pump 16, the second-section circulating tank 17, the second-section circulating pump 18, the third-section circulating tank 19, and the third-section circulating pump 20.

Cooling water of the first-section circulating cooler, the second-section circulating cooler, and the third-section circulating cooler comes from a desalinated water tank, and cooling water after heat exchange supplements feed water for a heating boiler.

The rich solution and lean solution heat exchanger 21 connects the multistage circulating absorption tower 15 to the carbon dioxide desorption tower 31. After the rich solution of the first-stage carbon dioxide absorption system passes through the rich solution pump 16 and then enters the rich solution and lean solution heat exchanger 21 for heat exchange, the rich solution communicates with the desorption tower nozzle 24 on an upper portion of the carbon dioxide desorption tower 31. After the lean solution at the bottom of the carbon dioxide desorption tower 31 passes through a lean solution pump 23 and then enters the rich solution and lean solution heat exchanger 21 for heat exchange, the lean solution enters the slurry cleaning device and then communicates with the second-section circulating cooler 13, and enters the second-stage carbon dioxide absorption system.

For other implementations, reference is made to Embodiment 1.

The rich solution enhances carbon dioxide desorption under the action of a 1000 kHz ultrasonic field, and a γ-$Al_2O_3$/zeolite molecular sieve composite catalyst is used to implement stable carbon dioxide desorption and further reduce energy consumption. After the flue gas with the flue gas quantity of 5000 m³/h is treated by the foregoing system, the decarburizing efficiency is 97%; and the desorption energy consumption is less than 1.8 GJ/t $CO_2$.

Embodiment 3

Figure 6:
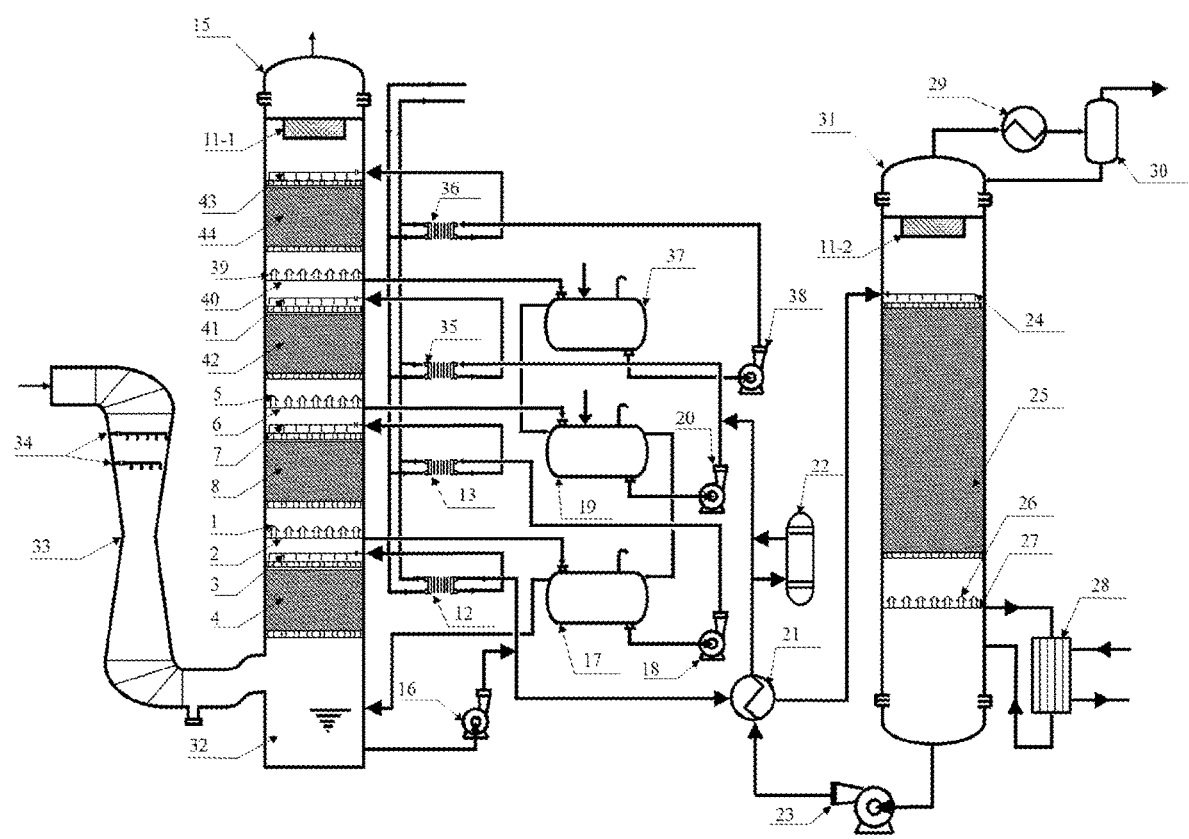
FIG. 6 is the process flowchart of four-stage circulation with venturi pre-washing section.

Referring to FIG. 6, in a method for carbon dioxide capture and concentration by partitioned multistage circulation based on mass transfer-reaction regulation, a system for carbon dioxide capture and concentration is adopted. The system for carbon dioxide capture and concentration comprises a multistage circulating absorption tower 15, a rich solution and lean solution heat exchanger 21, a slurry cleaning device 22, a carbon dioxide desorption tower 31, and a carbon dioxide concentration device.

The multistage circulating absorption tower 15 comprises a venturi pre-washing section 33, a first-stage carbon dioxide absorption system, a second-stage carbon dioxide absorption system, a third-stage carbon dioxide absorption system, and a fourth-stage washing system. The first-stage carbon dioxide absorption system, the second-stage carbon dioxide absorption system, the third-stage carbon dioxide absorption system, and the fourth-stage washing system are connected in series stage by stage from bottom to top, and a first demister 11-1 is disposed at the top of the multistage circulating absorption tower 15.

The venturi pre-washing section 33 is disposed in the front of the multistage circulating absorption tower 15, and communicates with the first-stage carbon dioxide absorption system. Washing, impurity removal and cooling water of the pre-washing section is preferably softened water, which is sprayed by a high-efficiency atomizing nozzle 34, and the washing, impurity removal and cooling water is recycled, and regularly discharged to a wet desulfurization slurry-preparing system as slurry preparing water.

Flue gas enters the venturi pre-washing section 33 and is cooled to 38° C.

The flue gas enters the first-stage carbon dioxide absorption system, and sequentially passes through a first-section packing layer 4, a first-section nozzle 3, a first partition plate 2, and a first gas lifting cap 1, and decarburization efficiency is 40%; an absorbent circulates in the first-stage carbon dioxide absorption system at 52° C., with the pH controlled at 8.5; an absorbent overflowing from a second-section circulating tank 17 is injected into a slurry tank 32, and enters the multistage circulating absorption tower 15 through a rich solution pump 16, a first-section circulating cooler 12, and the first-section nozzle 3, and a liquid-gas ratio is 0.86; and the absorbent falls into the slurry tank 32 after being in reverse contact with the flue gas through the first-section packing layer 4. After a liquid level in the slurry tank 32 reaches a certain height, a saturated rich solution enters the rich solution and lean solution heat exchanger 21 through the rich solution pump 16 and then enters the carbon dioxide desorption tower 31.

The flue gas enters the second-stage carbon dioxide absorption system, and sequentially passes through a second-section packing layer 8, a second-section nozzle 7, a second partition plate 6, and a second gas lifting cap 5, and decarburization efficiency is 90%; an absorbent circulates in the second-stage carbon dioxide absorption system at 46° C., with the pH controlled at 9.3; an absorbent overflowing from a third-section circulating tank 19 is injected into the second-section circulating tank 17, and enters the multistage circulating absorption tower 15 through a second-section circulating pump 18, a second-section circulating cooler 13, and the second-section nozzle 7, and a liquid-gas ratio is 1.3; and the absorbent falls to the first partition plate 2 after being in reverse contact with the flue gas through the second-section packing layer 8, and circulates to the second-section circulating tank 17. After a liquid level in the second-section circulating tank 17 reaches a certain height, the absorbent overflows to the slurry tank 32.

The flue gas enters the third-stage carbon dioxide absorption system, and sequentially passes through a third-section packing layer 42, a third-section nozzle 41, a third partition plate 40, and a third gas lifting cap 39, and decarburization efficiency is 98%; an absorbent circulates in the third-stage carbon dioxide absorption system at 41° C., with the pH controlled at 10.2; a fresh absorbent is injected into the third-section circulating tank 19, and enters the multistage circulating absorption tower 15 through a third-section circulating pump 20, a third-section circulating cooler 35, and the third-section nozzle 41, and a liquid-gas ratio is 1.1; after being in reverse contact with the flue gas through the third-section packing layer 42, the absorbent falls to the second partition plate 6, and circulates to the third-section circulating tank 19; and after a liquid level in the third-section circulating tank 19 reaches a certain height, the absorbent overflows to the second-section circulating tank 17.

The flue gas enters the fourth-stage washing system, and sequentially passes through a fourth-section packing layer 44 and a fourth-section nozzle 43, aerosol removal efficiency is 99% or above, and the flue gas passes through the first demister 11-1 and then is discharged to the atmosphere; softened water circulates in the fourth-stage washing system at 41° C., with the pH controlled at 9.2; fresh softened water is injected into the fourth-section circulating tank 37, and enters the multistage circulating absorption tower 15 through a fourth-section circulating pump 38, a fourth-section circulating cooler 36, and the fourth-section nozzle 43, and a liquid-gas ratio is 0.6; and after being in reverse contact with the flue gas through the fourth-section packing layer 44, the softened water falls to the third partition plate 40, and circulates to the fourth-section circulating tank 37.

Referring to FIG. 3, the intelligent regulation system is connected to the first-stage carbon dioxide absorption system, the second-stage carbon dioxide absorption system, the third-stage carbon dioxide absorption system, and the fourth-stage washing system, models and optimizes desorption energy consumption and carbon dioxide capture efficiency based on real-time operation parameters, and regulates the operation parameters to be optimal. Signals received by the intelligent regulation system come from the slurry tank 32, the rich solution pump 16, the second-section circulating tank 17, the second-section circulating pump 18, the third-section circulating tank 19, the third-section circulating pump 20, the fourth-section circulating tank 37, and the fourth-section circulating pump 38.

Cooling water of the first-section circulating cooler, the second-section circulating cooler, the third-section circulating cooler, and the fourth-section circulating cooler comes from a desalinated water tank, and cooling water after heat exchange supplements feed water for a heating boiler.

The rich solution and lean solution heat exchanger 21 connects the multistage circulating absorption tower 15 to the carbon dioxide desorption tower 31. After the rich solution of the first-stage carbon dioxide absorption system passes through the rich solution pump 16 and then enters the rich solution and lean solution heat exchanger 21 for heat exchange, the rich solution communicates with the desorption tower nozzle 24 on an upper portion of the carbon dioxide desorption tower 31. After the lean solution at the bottom of the carbon dioxide desorption tower 31 passes through a lean solution pump 23 and then enters the rich solution and lean solution heat exchanger 21 for heat exchange, the lean solution enters the slurry cleaning device and then communicates with the third-section circulating cooler 35, and enters the third-stage carbon dioxide absorption system.

For other implementations, reference is made to Embodiment 1.

After the flue gas with the flue gas quantity of 5000 m³/h is treated by the foregoing system, the decarburizing efficiency is 99%; and the desorption energy consumption is less than 2.2 GJ/t $CO_2$.

Embodiment 4

Figure 7:
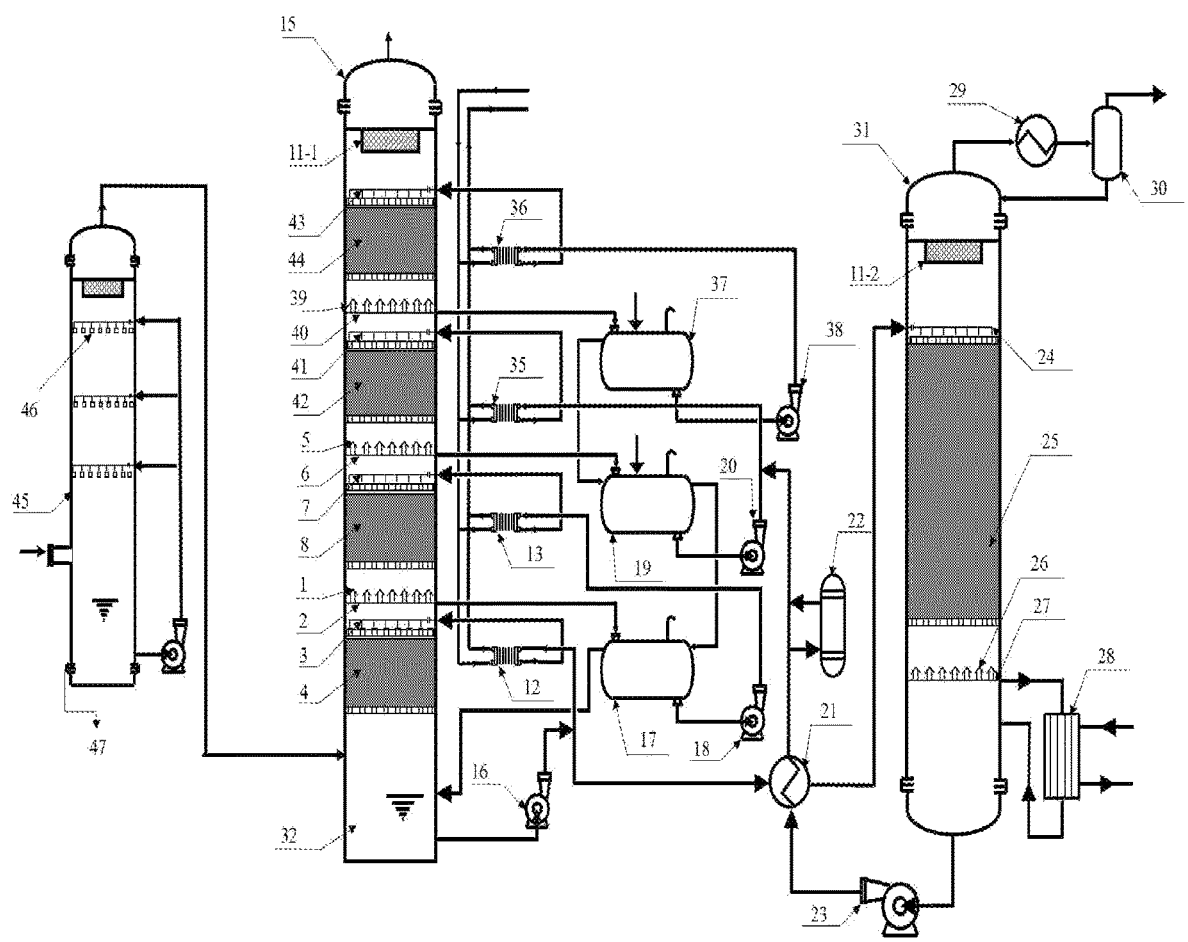
FIG. 7 is the process flowchart of three-stage circulation with pre-washing tower.

Referring to FIG. 7, in a method for carbon dioxide capture and concentration by partitioned multistage circulation based on mass transfer-reaction regulation, a system for carbon dioxide capture and concentration is adopted. The system for carbon dioxide capture and concentration comprises a pre-washing tower 45, a multistage circulating absorption tower 15, a rich solution and lean solution heat exchanger 21, a slurry cleaning device 22, a carbon dioxide desorption tower 31, and a carbon dioxide concentration device.

The multistage circulating absorption tower comprises a first-stage carbon dioxide absorption system, a second-stage carbon dioxide absorption system, a third-stage carbon dioxide absorption system, and a fourth-stage washing system. The first-stage carbon dioxide absorption system, the second-stage carbon dioxide absorption system, the third-stage carbon dioxide absorption system, and the fourth-stage washing system are connected in series stage by stage from bottom to top, and a first demister 11-1 is disposed at the top of the multistage circulating absorption tower.

The pre-washing tower 45 is disposed in the front of the multistage circulating absorption tower. Washing, impurity removal and cooling water of the pre-washing tower is preferably softened water, which is sprayed by a high-efficiency atomizing nozzle 46, and the washing, impurity removal and cooling water is recycled, and regularly discharged to a wet desulfurization slurry-preparing system 47 as slurry preparing water.

Flue gas enters the pre-washing tower 45 and is cooled to 40° C.

The flue gas enters the first-stage carbon dioxide absorption system, and sequentially passes through a first-section packing layer 4, a first-section nozzle 3, a first partition plate 2, and a first gas lifting cap 1, and decarburization efficiency is 41%; an absorbent circulates in the first-stage carbon dioxide absorption system at 52° C., with the pH controlled at 9.0; an absorbent overflowing from a second-section circulating tank 17 is injected into a slurry tank 32, and enters the multistage circulating absorption tower through a rich solution pump 16, a first-section circulating cooler 12, and the first-section nozzle 3, and a liquid-gas ratio is 0.86; and the absorbent falls into the slurry tank 32 after being in reverse contact with the flue gas through the first-section packing layer 4. After a liquid level in the slurry tank 32 reaches a certain height, a saturated rich solution enters the rich solution and lean solution heat exchanger 21 through the rich solution pump 16 and then enters the carbon dioxide desorption tower 31.

The flue gas enters the second-stage carbon dioxide absorption system, and sequentially passes through a second-section packing layer 8, a second-section nozzle 7, and a second partition plate 6, and decarburization efficiency is 91%; an absorbent circulates in the second-stage carbon dioxide absorption system at 46° C., with the pH controlled at 9.3; an absorbent overflowing from a third-section circulating tank 19 is injected into the second-section circulating tank 17, and enters the multistage circulating absorption tower through a second-section circulating pump 18, a second-section circulating cooler 13, and the second-section nozzle 7, and a liquid-gas ratio is 1.3; and the absorbent falls to the first partition plate 2 after being in reverse contact with the flue gas through the second-section packing layer 8, and circulates to the second-section circulating tank 17. After a liquid level in the second-section circulating tank 17 reaches a certain height, the absorbent overflows to the slurry tank 32.

The flue gas enters the third-stage carbon dioxide absorption system, and sequentially passes through a third-section packing layer 42, a third-section nozzle 41, and a third partition plate 40, and decarburization efficiency is 98%; an absorbent circulates in the third-stage carbon dioxide absorption system at 41° C., with the pH controlled at 10.2;

a fresh absorbent is injected into the third-section circulating tank 19, and enters the multistage circulating absorption tower 15 through a third-section circulating pump 20, a third-section circulating cooler 35, and the third-section nozzle 41, and a liquid-gas ratio is 1.1; after being in reverse contact with the flue gas through the third-section packing layer 42, the absorbent falls to the second partition plate 6, and circulates to the third-section circulating tank 19; and after a liquid level in the third-section circulating tank 19 reaches a certain height, the absorbent overflows to the second-section circulating tank 17.

The flue gas enters the fourth-stage washing system, and sequentially passes through a fourth-section packing layer 44 and a fourth-section nozzle 43, aerosol removal efficiency is 99% or above, and the flue gas passes through the first demister 11-1 and then is discharged to the atmosphere; softened water circulates in the fourth-stage washing system at 41° C., with the pH controlled at 9.2; fresh softened water is injected into the fourth-section circulating tank 37, and enters the multistage circulating absorption tower 15 through a fourth-section circulating pump 38, a fourth-section circulating cooler 36, and the fourth-section nozzle 43, and a liquid-gas ratio is 0.6; and after being in reverse contact with the flue gas through the fourth-section packing layer 44, the softened water falls to the third partition plate 40, and circulates to the fourth-section circulating tank 37.

Referring to FIG. 3, the intelligent regulation system is connected to the first-stage carbon dioxide absorption system, the second-stage carbon dioxide absorption system, the third-stage carbon dioxide absorption system, and the fourth-stage washing system, models and optimizes desorption energy consumption and carbon dioxide capture efficiency based on real-time operation parameters, and regulates the operation parameters to be optimal. Signals received by the intelligent regulation system come from the slurry tank 32, the rich solution pump 16, the second-section circulating tank 17, the second-section circulating pump 18, the third-section circulating tank 19, the third-section circulating pump 20, the fourth-section circulating tank 37, and the fourth-section circulating pump 38.

Cooling water of the first-section circulating cooler, the second-section circulating cooler, the third-section circulating cooler, and the fourth-section circulating cooler comes from a desalinated water tank, and cooling water after heat exchange supplements feed water for a heating boiler.

The rich solution and lean solution heat exchanger 21 connects the multistage circulating absorption tower to the carbon dioxide desorption tower 31. After the rich solution of the first-stage carbon dioxide absorption system passes through the rich solution pump 16 and then enters the rich solution and lean solution heat exchanger 21 for heat exchange, the rich solution communicates with the desorption tower nozzle 24 on an upper portion of the carbon dioxide desorption tower 31. After the lean solution at the bottom of the carbon dioxide desorption tower 31 passes through a lean solution pump 23 and then enters the rich solution and lean solution heat exchanger 21 for heat exchange, the lean solution enters the slurry cleaning device and then communicates with the third-section circulating cooler 35, and enters the third-stage carbon dioxide absorption system.

For other implementations, reference is made to Embodiment 3.

After the flue gas with the flue gas quantity of 5000 m³/h is treated by the foregoing system, the decarburizing efficiency is 99%; and the desorption energy consumption is less than 2.2 GJ/t $CO_2$.

Embodiment 5

In the foregoing method, with Embodiment 3 as an example, operation parameters of different flue gas quantities are shown in Table 1.

TABLE 1

|  | 1 | 2 | 3 | 4 | 5 | 6 | 7 |
|---|---|---|---|---|---|---|---|
| Flue gas flow rate (m³/h) | 2000 | 3000 | 4000 | 5000 | 6000 | 7000 | 8000 |
| Carbon dioxide content (%) | 14 | 14 | 14 | 14 | 14 | 14 | 14 |
| Decarburization efficiency (%) | 98 | 98 | 98 | 99 | 98 | 98 | 98 |
| Liquid-gas ratio (L/m³) of a fourth-stage washing system | 0.6 | 0.6 | 0.6 | 0.6 | 0.6 | 0.6 | 0.6 |
| Liquid-gas ratio (L/m³) of a third-stage carbon dioxide absorption system | 1.1 | 1.1 | 1.1 | 1.1 | 1.1 | 1.1 | 1.1 |
| Liquid-gas ratio (L/m³) of a second-stage carbon dioxide absorption system | 1.3 | 1.3 | 1.3 | 1.3 | 1.3 | 1.3 | 1.3 |
| Liquid-gas ratio (L/m³) of a first-stage carbon dioxide absorption system | 0.86 | 0.86 | 0.86 | 0.86 | 0.86 | 0.86 | 0.86 |
| Diameter (m) of a packing tower | 1.2 | 1.2 | 1.3 | 1.5 | 1.5 | 1.6 | 1.8 |
| Height (m) of fourth-stage packing | 0.92 | 1.38 | 1.56 | 1.47 | 1.76 | 1.80 | 1.63 |
| Height (m) of third-stage packing | 1.68 | 2.52 | 2.86 | 2.68 | 3.22 | 3.30 | 2.98 |
| Height (m) of second-stage packing | 1.83 | 2.74 | 3.12 | 2.93 | 3.51 | 3.60 | 3.25 |
| Height (m) of first-stage packing | 1.22 | 1.83 | 2.08 | 1.95 | 2.34 | 2.40 | 2.17 |

The present invention can capture carbon dioxide with low energy consumption and high efficiency, inhibit generation of secondary pollutants, and recover high-purity carbon dioxide. In an industrial carbon dioxide capture process, high energy consumption for carbon dioxide capture is the biggest problem for carbon capture, and the presence of pollutants such as acid gases and metal ions also has a negative impact on carbon dioxide capture. An operation cost of non-circulating carbon capture is high, and an absorbent loss is large. Therefore, multiple means such as multistage circulating absorption, intelligent multi-factor regulation, pre-washing and cooling, inter-stage cooling, post-stage washing, slurry cleaning, cooling water waste heat utilization, small-particle-size and high-density spraying, strengthening of an external field such as a thermal field/ultrasonic field/electric field, and composite catalyst catalysis are adopted, so that with low cost, low energy consumption, stability and high efficiency as optimization objectives, the generation of secondary pollutants is inhibited while carbon dioxide is efficiently captured, and low-energy desorption and high-purity concentration of carbon dioxide are implemented. In the present invention, multi-stage decarburization and one-stage washing are adopted in an absorption section of a partitioned multistage circulating absorption tower, so that different circulation sections can play different roles. A low-stage carbon dioxide absorption system can increase the residence time of an absorbent and further increase a carbon dioxide load; an intermediate-stage carbon dioxide absorption system is a main absorption section, which absorbs the most carbon dioxide; and a high-stage carbon dioxide absorption system has pH greater than 10, which ensures decarburization efficiency. Softened water circulates in n stages of washing systems, and a main objective is to remove aerosols from flue gas and inhibit the generation of secondary pollutants. In this way, different functions are combined together, so that the structure of the absorption tower is compact and functions are integrated, which lays a foundation for further optimizing the layout of a flue gas purification system.

Comparative Example 1

With reference to Embodiment 3, this comparative example differs in that a first-stage carbon dioxide absorption system is implemented with pH of 7.5 at 48° C., with a liquid-gas ratio of 0.5; a second-stage carbon dioxide absorption system is implemented with pH of 8.0 at 44° C., with a liquid-gas ratio of 1.0; a third-stage carbon dioxide absorption system is implemented with pH of 9.5 at 40° C., with a liquid-gas ratio of 1.0; and a fourth-stage washing system is implemented with pH of 8.5 at 40° C., with a liquid-gas ratio of 0.5. After the flue gas with the flue gas quantity of 5000 m$^3$/h is treated by the foregoing system, the decarburizing efficiency is 79%.

Comparative Example 2

With reference to Embodiment 3, this comparative example differs in that a first-stage carbon dioxide absorption system is implemented with pH of 8.0 at 56° C., with a liquid-gas ratio of 0.6; a second-stage carbon dioxide absorption system is implemented with pH of 8.5 at 55° C., with a liquid-gas ratio of 0.9; a third-stage carbon dioxide absorption system is implemented with pH of 9.4 at 50° C., with a liquid-gas ratio of 1.0; and a fourth-stage washing system is implemented with pH of 10 at 50° C., with a liquid-gas ratio of 0.5. After the flue gas with the flue gas quantity of 5000 m$^3$/h is treated by the foregoing system, the decarburizing efficiency is 80%.

In the present invention, multiple means such as multi-stage circulating absorption, intelligent multi-factor regulation, pre-washing and cooling, inter-stage cooling, post-stage washing, slurry cleaning, cooling water waste heat utilization, small-particle-size and high-density spraying, strengthening of an external field such as a thermal field/ultrasonic field/electric field, and catalysis by a composite catalyst are adopted, so that with low cost, low energy consumption, stability and high efficiency as optimization objectives, the generation of secondary pollutants is effectively inhibited while carbon dioxide is efficiently captured, and high-efficiency capture, low-energy desorption, and high-purity concentration of carbon dioxide are implemented. The multistage circulation is used to remove aerosols from top to bottom in sequence, which improves carbon capture efficiency, maintains an absorption rate, concentrates a rich solution, and increases economic benefits of a power plant.

The preferred implementations of the present invention have been described in detail above, but the present invention is not limited thereto. Within the scope of the technical conception of the present invention, many simple modifications may be made to the technical solutions of the present invention, including a combination of various technical features in any other suitable way. These simple modifications and combinations should also be regarded as the disclosure of the present invention and fall within the protection scope of the present invention.

What is claimed is:

1. A method for carbon dioxide capture and concentration by partitioned multistage circulation based on mass transfer-reaction regulation, comprising: introducing flue gas into a multistage circulating absorption tower, performing impurity removal and cooling on the flue gas through a pre-washing device disposed in a front of the multistage circulating absorption tower and then successively introducing the flue gas into a first stage carbon dioxide absorption system to $(n-1)^{th}$ stage carbon dioxide absorption system and $n^{th}$ stage washing system, wherein n is greater than or equal to 3; introducing a rich solution into a carbon dioxide desorption tower through a rich solution and lean solution heat exchanger, and discharging a lean solution out of the carbon dioxide desorption tower and introducing the lean solution into the rich solution and lean solution heat exchanger; introducing regenerated gas from the carbon dioxide desorption tower into a carbon dioxide concentration device, and introducing the regenerated gas into a gas-liquid separator through a cooler; connecting an intelligent regulation system respectively to the first to $(n-1)^{th}$ stages carbon dioxide absorption systems, the $n^{th}$ stages washing system, and the carbon dioxide desorption tower; and connecting in series the first to $(n-1)^{th}$ stages carbon dioxide absorption systems and the $n^{th}$ stage washing system in the multistage circulating absorption tower stage by stage from bottom to top;

wherein the pre-washing device is a venturi pre-washing section or a vertical pre-washing tower; washing, impurity removal and cooling water of the pre-washing device is softened water, which is sprayed by an atomizing nozzle, and the washing, impurity removal and cooling water is recycled, and regularly discharged to a wet desulfurization slurry-preparing system as slurry preparing water;

wherein the pre-washing device is the venturi pre-washing section, and the multistage circulating absorption tower is a four-stage circulating absorption tower with n equal to 4; and the method comprises the following steps:

(1) introducing flue gas into the four-stage circulating absorption tower, and performing impurity removal and cooling on the flue gas through the venturi pre-washing section disposed in the front and then introducing the flue gas into the first-stage carbon dioxide absorption system, a second-stage carbon dioxide absorption system, a third-stage carbon dioxide absorption system, and a fourth-stage washing system in sequence, wherein an absorbent circulates in the first-stage carbon dioxide absorption system with pH of 7.7-9.0 at 49-60° C.;

an absorbent circulates in the second-stage carbon dioxide absorption system with pH of 8.0-10.0 at 44-53° C.;
an absorbent circulates in the third-stage carbon dioxide absorption system with pH of 9.5-11.5 at 40-48° C.; and
softened water circulates in the fourth-stage washing system with pH of 8.5-10.0 at 40-48° C.:
(2) heating the rich solution through rich solution and lean solution heat exchanger to 90-98° C. and then introducing the rich solution into the carbon dioxide desorption tower; after the absorption liquid is heated to 105-115° C., enhancing carbon dioxide desorption by the rich solution under a coupling action of a plurality of fields including thermal field, ultrasonic field, and electric field; and using composite catalyst that is one or more of a $\gamma$-$Al_2O_3$/zeolite molecular sieve, an $SO_4^{2-}$/$ZrO_2$-zeolite molecular sieve, a shell-coated $SO_4^{2-}$/$ZrO_2$-zeolite molecular sieve, shell-coated $SO_4^{2-}$/$ZrO_2$—$TiO_2$, shell-coated $SO_4^{2-}$/$CoO$—$TiO_2$ to improve stability and reduce desorption energy consumption; and discharging the lean solution out of the carbon dioxide desorption tower and introducing the lean solution into the rich solution and lean solution heat exchanger for cooling to 60-68° C., and then introducing the lean solution to the second-stage carbon dioxide absorption system;
(3) introducing regenerated steam of the carbon dioxide desorption tower into the carbon dioxide concentration device, cooling the regenerated steam by the cooler to the boiling point of carbon dioxide or below, and introducing the regenerated steam into gas-liquid separator to obtain high-purity carbon dioxide; and
(4) connecting the intelligent regulation system to the first-stage carbon dioxide absorption system, the second-stage carbon dioxide absorption system, the third-stage carbon dioxide absorption system, the fourth-stage washing system, and the carbon dioxide desorption tower, and establishing a global optimization parameter model of carbon dioxide absorption and carbon dioxide desorption by partitioned multistage circulation based on key parameters comprising pH, temperature, and circulation quantity in each stage to implement stable, efficient and low-cost operation of the system.

2. The method for carbon dioxide capture and concentration by partitioned multistage circulation based on mass transfer-reaction regulation according to claim 1, wherein the first-stage carbon dioxide absorption system comprises a first-section packing layer, a first-section nozzle, a first partition plate, and a first gas lifting cap that are sequentially disposed from bottom to top, and the bottom of the absorption tower communicates with the first-section nozzle through a rich solution pump and a first-section circulating cooler;
the second-stage carbon dioxide absorption system comprises a second-section packing layer, a second-section nozzle, a second partition plate, and a second gas lifting cap that are sequentially disposed from bottom to top, the bottom of the second-stage carbon dioxide absorption system communicates with a second-section circulating tank, and the second-section circulating tank communicates with the second-section nozzle through a second-section circulating pump and a second-section circulating cooler;
the third-stage carbon dioxide absorption system comprises a third-section packing layer, a third-section nozzle, a third partition plate, and a third gas lifting cap that are sequentially disposed from bottom to top, the bottom of the third-stage carbon dioxide absorption system communicates with a third-section circulating tank, and the third-section circulating tank communicates with the third-section nozzle through a third-section circulating pump and a third-section circulating cooler; and
the fourth-stage washing system comprises a fourth-section packing layer and a fourth-section nozzle that are sequentially disposed from bottom to top, the bottom of the fourth-stage washing system communicates with a fourth-section circulating tank, and the fourth-section circulating tank communicates with the fourth-section nozzle through a fourth-section circulating pump and a fourth-section circulating cooler.

3. The method for carbon dioxide capture and concentration by partitioned multistage circulation based on mass transfer-reaction regulation according to claim 1, wherein a first demister is disposed in the multistage circulating absorption tower, and the first demister is located above the $n^{th}$ stage of washing systems.

4. The method for carbon dioxide capture and concentration by partitioned multistage circulation based on mass transfer-reaction regulation according to claim 2, wherein the first-section nozzle, the second-section nozzle, the third-section nozzle, and the fourth-section nozzle are bidirectional hollow cone nozzle or unidirectional hollow cone nozzle with Archimedean spiral structure; when the first-section nozzle, the second-section nozzle, and the third-section nozzle use the Archimedean spiral structure, a total of 32 nozzles are arranged in a circumferential direction, and the nozzles are five-head nozzle with pore diameter of 0.8 mm.

5. The method for carbon dioxide capture and concentration by partitioned multistage circulation based on mass transfer-reaction regulation according to claim 3, wherein the carbon dioxide desorption tower comprises a desorption heater, and a desorption tower nozzle, a desorption tower packing layer, a desorption tower gas lifting cap and desorption tower partition plate that are sequentially arranged from top to bottom; the desorption tower partition plate, the desorption heater, and the bottom of the carbon dioxide desorption tower communicate with each other; a second demister for removing aerosols and liquid drops is disposed at the top of the carbon dioxide desorption tower; the carbon dioxide concentration device comprises a cooling device and a gas-liquid separator; and the cooling device and the gas-liquid separator constitute a cycle with the top of the carbon dioxide desorption tower.

6. The method for carbon dioxide capture and concentration by partitioned multistage circulation based on mass transfer-reaction regulation according to claim 1, wherein a slurry cleaning device is disposed downstream of the rich solution and lean solution heat exchanger, and the slurry cleaning device comprises an ion exchanger and a filter.

7. The method for carbon dioxide capture and concentration by partitioned multistage circulation based on mass transfer-reaction regulation according to claim 1, wherein fresh softened water is injected into a fourth-section circulating tank, and enters the multistage circulating absorption tower through a fourth-stage circulating pump, the fourth-section circulating cooler, and the fourth-section nozzle, the liquid-gas ratio is 0.5-2.0, and the fresh softened water falls to a third partition plate after being in reverse contact with the flue gas through the fourth-section packing layer, and circulates to the fourth-section circulating tank;

fresh absorbent is injected into a third-section circulating tank, and enters the multistage circulating absorption tower through a third-stage circulating pump, a third-section circulating cooler, and a third-section nozzle, the liquid-gas ratio is 1.0-2.0, and the fresh absorbent falls to a second partition plate after being in reverse contact with the flue gas through a third-section packing layer, and circulates to the third-section circulating tank; after the liquid level in the third-section circulating tank reaches a certain height, the absorbent overflows to a second-section circulating tank;

the absorbent overflowing from the third-section circulating tank is injected into a second-section circulating tank, and enters the multistage circulating absorption tower through the second-section circulating pump, the second-section circulating cooler, and a second-section nozzle, the liquid-gas ratio is 1.0-2.5, and the absorbent falls to a first partition plate after being in reverse contact with the flue gas through a second-section packing layer, and circulates to the second-section circulating tank; after the liquid level in the second-section circulating tank reaches a certain height, the absorbent overflows to a slurry tank; and the absorbent overflowing from the second-section circulating tank is injected into the slurry tank, and enters the multistage circulating absorption tower through a rich solution pump, the first-section circulating cooler, and the first-section nozzle, the liquid-gas ratio is 0.6-2.0, and the absorbent falls to the slurry tank after being in reverse contact with the flue gas through the first-section packing layer; and after the liquid level in the slurry tank reaches a certain height, the saturated rich solution enters the rich solution and lean solution heat exchanger through the rich solution pump and then enters the carbon dioxide desorption tower.

8. The method for carbon dioxide capture and concentration by partitioned multistage circulation based on mass transfer-reaction regulation according to claim 1, wherein the intelligent regulation system performs multi-factor regulation based on a system for carbon dioxide absorption by partitioned multistage circulation, comprising the following steps:

I: establishing the database comprising multi-device multi-scale inlet/outlet flue gas parameters, reaction liquid parameters, and desorption energy consumption parameters based on online monitoring and offline data and device design parameters, wherein the parameters comprise the flue gas flow rate G, partial pressures $p_{CO_2,out}$ and $p_{CO_2,in}$ of carbon dioxide at the flue gas inlet and outlet, an absorbent concentration $c_{ab}$, and pH, temperature T and circulation quantity L of $(1-n)^{th}$ stages of circulating liquids;

II: based on mechanism research and the parameter database, obtaining the relationship between desorption energy consumption and the pH, temperature and circulation quantity in each stage, constructing a key parameter model of multi-factor regulation over the absorption-desorption process under collaborative driving by a mechanism of a system for carbon dioxide capture and concentration by partitioned multistage circulation and the data, studying key indexes of efficiency, energy consumption, and material consumption in a state of partitioned multistage circulating operation, and constructing a comprehensive cost model of energy consumption and material consumption of the system for carbon dioxide capture and concentration by partitioned multistage circulation;

wherein the key parameter model of multi-factor regulation over an absorption-desorption process is as follows:

$p_{CO_2,out} = f(pH_{1 \sim n}, T_{1 \sim n}, L_{1 \sim n}, G, p_{CO_2,in}, L_{i \sim n}, c_{ab})$; and the comprehensive cost model of energy consumption and material consumption is as follows:

$COST_{ccs} = COST_{steam} + COST_{cp} + COST_{lp} + COST_{rp} + COST_{ier} + COST_w + COST_{ab} - R_{CO_2} + COST_f$ III: constructing a global optimization parameter model of the system for carbon dioxide capture and concentration by partitioned multistage circulation under an variable load/working condition based on efficiency, energy consumption and material consumption analysis by using an established model under a collaborative driving by the absorption-desorption mechanism and data as well as the comprehensive cost model of energy consumption and material consumption, accurately evaluating in real time a dynamic operating cost of the entire absorption-desorption process of the system for carbon dioxide capture and concentration under different working conditions, introducing the cost effectiveness optimization problem of the system for carbon dioxide capture and concentration by partitioned multistage circulation, and solving the problem by using intelligent optimization algorithms comprising particle swarm optimization and ant colony optimization to obtain the parameter combination for an optimal comprehensive cost of energy consumption and material consumption, wherein the cost effectiveness optimization problem of the system for carbon dioxide capture and concentration by partitioned multistage circulation is as follows:

$$\min COST_{CCS} = COST_{steam} + COST_{cp} + COST_{lp} + COST_{rp} + COST_{ier} + COST_w + COST_{ab} - R_{CO_2} + COST_f$$

$$s.t. \begin{cases} \eta_{ccs} \geq 90\% \\ pH_{i,max} \geq pH_i \geq pH_{i,min}, i \in [1, n] \\ T_{i,max} \geq T_i \geq T_{i,min}, i \in [1, n] \\ L_{i,max} \geq L_i \geq L_{i,min}, i \in [1, n] \end{cases};$$

and

V: after the parameter combination for the optimal comprehensive cost of energy consumption and material consumption is obtained, using advanced control methods comprising predictive control and fuzzy control to implement real-time, accurate and stable control over parameters by using the parameter combination as a control objective, to ensure that efficiency of the system for carbon dioxide capture and concentration reaches a standard steadily, and optimize energy consumption and material consumption.

\* \* \* \* \*